United States Patent
Smith et al.

(10) Patent No.: US 10,698,073 B2
(45) Date of Patent: Jun. 30, 2020

(54) WIRELESS ACCESS POINT LOCATION ESTIMATION USING COLLOCATED HARVEST DATA

(71) Applicant: Apple Inc., Cupertino, CA (US)

(72) Inventors: Brian Stephen Smith, Campbell, CA (US); Robert Mayor, Half Moon Bay, CA (US); Ronald K. Huang, San Jose, CA (US); Lukas M. Marti, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 618 days.

(21) Appl. No.: 14/292,631

(22) Filed: May 30, 2014

(65) Prior Publication Data

US 2015/0346313 A1 Dec. 3, 2015

(51) Int. Cl.
*G01S 5/02* (2010.01)

(52) U.S. Cl.
CPC .......... *G01S 5/0242* (2013.01); *G01S 5/0252* (2013.01)

(58) Field of Classification Search
CPC ...... G01S 5/0242; G01S 5/021; G01S 5/0252; H04W 64/00; H04W 64/003
See application file for complete search history.

(56) References Cited

U.S. PATENT DOCUMENTS

| | | | |
|---|---|---|---|
| 8,532,567 B2* | 9/2013 | Moeglein | G01S 5/0236 342/357.21 |
| 8,634,359 B2* | 1/2014 | Arslan | G01S 5/0252 370/329 |
| 9,730,019 B2* | 8/2017 | Wirola | H04W 64/003 |
| 2012/0309428 A1* | 12/2012 | Marti | H04W 64/003 455/456.5 |
| 2013/0344886 A1* | 12/2013 | Jarvis | G01S 5/02 455/456.1 |
| 2014/0243013 A1* | 8/2014 | Liu | H04W 64/003 455/456.1 |

* cited by examiner

*Primary Examiner* — Cassi J Galt
(74) *Attorney, Agent, or Firm* — Fish & Richardson P.C.

(57) ABSTRACT

Collocated access point (AP) harvest data is combined with accurate location-tagged harvest data to improve access point location estimates and to estimate the location of access points that could not be previously estimated.

26 Claims, 25 Drawing Sheets

… (1)

WIRELESS ACCESS POINT LOCATION ESTIMATION USING COLLOCATED HARVEST DATA

TECHNICAL FIELD

This disclosure relates generally to building and maintaining a reference database of estimated locations of wireless access points for wireless location estimation applications.

BACKGROUND

Many modern mobile devices (e.g., a smart phone, tablet computer, wearable computer) include positioning systems for determining the current location of the mobile device. The positioning systems often include satellite-based systems such as the Global Positioning System (GPS) and/or network-based systems such as WiFi positioning systems. The WiFi positioning systems scan for radio frequency (RF) signals provided by RF transmitters, often referred to as "access points." Using these RF signals and the estimated locations of the access points (often provided by a reference database of estimated access point locations), an estimated location of a location-aware device can be determined and provided to an application. For example, the estimated location of a client device can be used by navigation and location-based service (LBS) applications.

Current techniques use access point (AP) information harvested from a large number of client devices. Server computers process the harvested information using statistical algorithms and serve the estimated AP positions to the client devices upon request, which the client devices use, together with WiFi scan information (e.g., AP signal strengths) to estimate their respective client device locations. For example, the client devices can determine from a WiFi scan a set of APs and corresponding Received Signal Strength Indicators (RSSIs). The estimated positions of the APs can be retrieved from a remote reference database and stored in cache memory of the client device. The estimated locations of the APs can be used with the currently observed RSSI values to estimate the current location (e.g., latitude, longitude, altitude) of the client device.

Conventional AP harvesting techniques require client devices to have accurate location estimation during harvesting, which is often provided by a satellite-based positioning system such as Global Positioning System (GPS). The harvest data can include a list of observed APs, their corresponding RSSI values, a timestamp and GPS data for the location of the observation. The requirement for accurate GPS data cannot be met when GPS data is unavailable or inaccurate, such as in dense urban areas or the interior of structures. The requirement of accurate AP locations also biases AP location estimates towards locations where GPS is available, leading to inaccurate AP location estimates for APs operating in environments where GPS is unavailable.

SUMMARY

Collocated access point (AP) harvest data is combined with accurate location-tagged harvest data to improve access point location estimates and to estimate the location of access points that could not be previously estimated. In some implementations, the harvest data can be sent to one or more servers periodically or in response to one or more trigger events. The location of each AP in the wireless scans (e.g., WiFi scans) is estimated using the harvest data. Each AP location can be modeled as a multivariate random variable, with estimated uncertainty based on the harvest location of each wireless scan, weighted according to age and RSSI values. When the estimated harvest location of a wireless scan is known or estimated with high certainty (e.g., using GPS data), then this estimated harvest location is processed directly, providing an initial estimate of some of the AP locations detected in the wireless scan. When the harvest location is uncertain or unknown, the harvest location is treated as a parameter to be optimized. These parameters can be estimated in an iterative manner, first using the initial AP locations derived from wireless scans with known harvest locations, considering the RSSI and estimated AP location uncertainty for each AP in the WiFi scan. These new parameters provide new estimated AP locations, while also providing AP location estimates for previously unknown APs (i.e., APs which did not occur in harvest data with accurate, initial WiFi scan location estimates).

In some implementations, a method of using collocated AP harvest data to estimate AP locations comprises: generating a first set of estimated locations of access points of a wireless network using a first set of harvest data associated with the access points, the first set of harvest data including one or more harvest locations where the harvest data was collected; receiving a second set of harvest data associated with the access points that do not include harvest locations; estimating harvest locations for the second set of harvest data using the first set of estimated access point locations; combining the estimated harvest locations with the second set of harvest data; and generating a second set of estimated locations of access points using the first and second sets of harvest data.

Other implementations are directed to systems, devices and computer-readable mediums. Particular implementations disclosed herein provide one or more of the following advantages. Collocated AP harvest data allows estimation of wireless AP locations when accurate WiFi scan location data is unavailable (e.g., no GPS data available), thus improving the accuracy and robustness of network-based client device location estimation.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Overview of Managing a Location Database

Figure 1A:
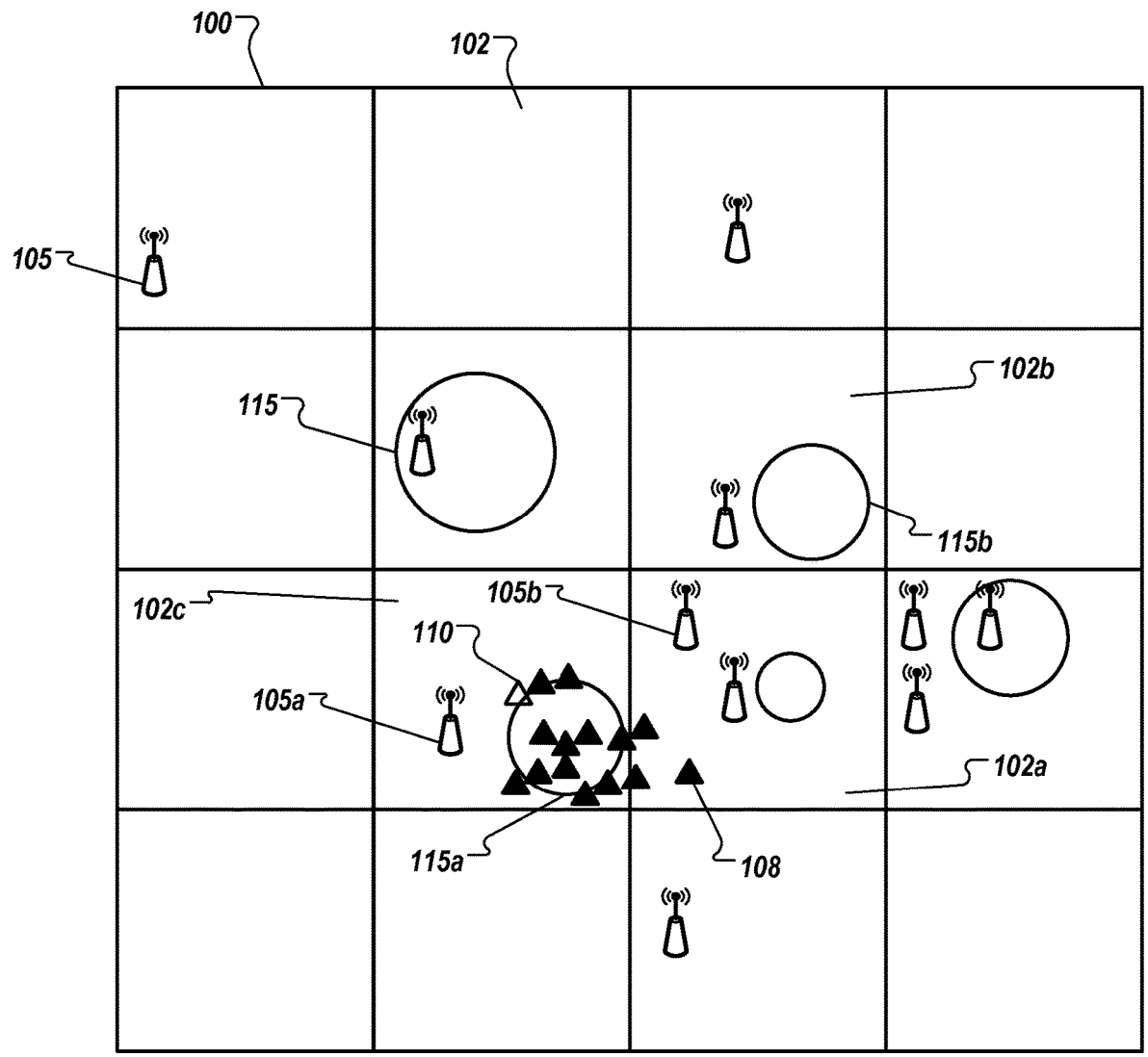
FIG. 1A is an overview of techniques of managing a location database.

FIG. 1A is an overview of techniques of managing a location database for network-based position system. A wireless local area network (WLAN) can be a radio communications network that includes a number of access points 105. Access points 105 can include hardwire devices or computer software that can act as a communication hub for wireless devices to connect to a wired network. Multiple access points 105 can be distributed in an area (e.g., an office building or an airport).

Access point 105 can communicate with wireless devices (e.g., mobile devices 108 and 110) using various communication protocols. In some implementations, access point 105 can be an access point of a WiFi™ network, which implements an Institute of Electrical and Electronics Engineers (IEEE) 802.11 based protocol (e.g., IEEE 802.11a). In some implementations, access point 105 can be an access point of a worldwide interoperability for microwave access (WiMAX) network, which implements an IEEE 802.16 based protocol (e.g., IEEE 802.16-2004 or IEEE 802.16e-2005). Access point 105 can have a communication range that can reach from location of access point 105 to anywhere from less than ten meters to several hundred meters, depending on factors including configuration of access point 105 and physical surroundings. Multiple wireless devices 108 and 110 can connect to an access point when mobile devices 108 and 110 are within the communication range of access point 105. In turn, multiple access points 105 can be available to a single mobile device 108 or 110 for connection. Mobile devices 108 and 110 can select a particular access point 105 to which mobile devices 108 and 110 can connect based on various factors. For example, the selection can be based on whether mobile device 108 is authorized to connect to access point 105*a*, or whether access point 105*a* can provide the strongest signal for the wireless connection to mobile devices 108.

The system can determine location areas 115 that are associated with access points 105. Location areas 115 can be calculated such that they indicate where mobile devices 108 located within a communication range of access points 105 are likely to be located. The system can make the determination based on known locations from mobile devices 108 that are located within a communication range of access points 105. Mobile devices 108 can be location-aware mobile devices, for example, GPS-enabled mobile devices that have built-in, or be coupled with, receivers that can receive Global Positioning System (GPS) signals and determine locations using the GPS signals. Location-aware mobile devices 108 are represented as black triangles in FIG. 1A. When location-aware mobile devices 108 are located within a communication range of a particular access point 105 (e.g., access point 105*a*), location-aware mobile devices 108 can transmit the locations of the devices to access point 105*a*. Access point 105*a* can relay the transmission, as well as an identifier of access point 105*a*, to the system. The system can determine an estimated location area 115*a* where any mobile device 108 or 110 located within a communication range of access point 105*a* is most likely located. In this specification, estimated location areas 115 will be referred to as presence areas, to indicate that mobile device 108 or 110, when located within a communication range of a particular access point 105, is likely to be present.

To calculate presence areas 115, the system can apply an iterative process (e.g., by performing a multi-pass analysis). The iterative process can determine a presence area (e.g., presence area 115) that is associated with an access point (e.g., access point 105) as a circle. The circle can have a center that corresponds to an average geographic location calculated based on locations of location-aware mobile devices 108 that are connected to access point 105. The circle can have a radius that corresponds to an error margin, which can be determined by, for example, a distance between a location of a mobile device 108 and the average geographic location. Further details on the iterative process will be described below in reference to FIGS. 2 and 3. The iterative process can be executed periodically (e.g., every six hours) to capture different wireless access usage patterns during different hours of a day as well as to capture potential moves of access points 105.

The system can send information of presence areas 115 to mobile devices, including non-GPS-enabled mobile devices (e.g., mobile device 110), that are located within a communication range of access points 105 such that the receiving mobile devices can determine estimated locations of the devices using presence areas 115. For example, if mobile device 110 is located within a communication range of access point 105*b*, the location of mobile device 110 can be estimated as to coincide with presence area 115*b* that is associated with access point 105*b*.

In a given area (e.g., an airport), numerous access points 105 can exist. Furthermore, as mobile device 110 can be mobile, it can be logical to send locations of access points that are not immediately within a communication range of mobile device 110 but are close-by enough to mobile device 110, such that mobile device 110 can use the locations to track its movement. To avoid sending a large amount of location data to mobile device 110, the system can filter access points 105 and location areas 115 such that only the location data of a limited number of access points (e.g., access point 105a), rather than location data of every single access points that exists in the world, are transmitted. Filtering can be based on various factors, including popularity, stability, longevity, and freshness of locations 115 and access points 105.

To filter locations 115 and access points 105, the system can create geographic grid 100 that contain cells 102. Cell 102 can be a polygon having a substantially rectangular shape, the polygon corresponding to a geographic area identifiable on geographic grid 100 by a latitude and a longitude of an identifying point of the geographic area (e.g., a center, or a corner), and a size (e.g., a length measured in degrees of longitude, and a width measured in degrees of latitude). Each cell 102 can be used as a container that can contain a certain number of locations. For example, cell 102 can be a rectangle whose length is 0.0005 degrees meridian (approximately 56 meters) and whose width 0.0005 degrees latitude (width in meters can vary depending on the latitude). Cell 102 can be configured to hold a number (e.g., three) of presence areas 115 corresponding to access points 105. In some implementations, cell 102 can "hold" presence area 115 if the center of presence area 115 is located within boundaries of cell 102. The presence areas 115 can be selected from all presence areas 115 that are located in cell 102 based on one or more reliability factors. The selection can be based on various criteria such as popularity, stability, longevity, and freshness.

A particular access point (e.g., access point 105b) and the presence area associated with the access point (e.g., presence area 115b) need not be located in a same cell 102. This can happen, for example, when access point 105b is located on a building in cell 102a and most mobile devices 108 located within a communication range of access point 105b are located in another building in cell 102b. In some implementations, the system can ignore the actual location of access point 105b.

When mobile device 110 connects to an access point (e.g., access point 105a, whose associated presence area 115a is located in cell 102c), or connected to the system in other ways (e.g., through a cellular network), mobile device 110 can receive a location update from the system. The location update can include all presence areas 115 that are located in the same cell where presence area 115a is located (e.g., cell 102c). The location update can further include presence areas 115 that are located in other cells 102 (e.g., cell 102a and cell 102b) that are neighbors to cell 102c on geographic grid 100.

When mobile device 110 connects to access point 105a, mobile device 110 can detect other access points 105 (e.g., access point 105b) that are available. Mobile device 110 can identify presence areas (e.g., presence areas 115a and 115b) for the available access points. Mobile device 110 can calculate a current location of mobile device 110 using various algorithms. For example, when only one presence area 115a is identified, mobile device 110 can designate presence area 115a as the current location of mobile device 110. When two or more presence areas 115 are identified, mobile device 110 can calculate its current location using an iterative process (e.g., a multi-pass analysis). The iterative process can calculate an average location of the presence areas, calculate distances between the presence areas and the average location, and exclude presence areas that are the farthest away from the average location. Mobile device 110 can repeat the iterations until a precision requirement is satisfied for determining a location of mobile device 110. Mobile device 110 can designate the average location as a current location of mobile device 110 and display the average location on a map display device.

In some implementations, the location update received on mobile device 110 from the system can include numerous neighboring cells such that a sufficiently large area (e.g., one or two square kilometers) around presence area 115a can be covered. Based on the location update that covers the large area, mobile device 110 can avoid having to request frequent updates when mobile device 110 moves. Mobile device 110 can have opportunities to receive updated presence area information when, for example, mobile device 110 is idle or otherwise has available communication bandwidth.

Figure 1B:
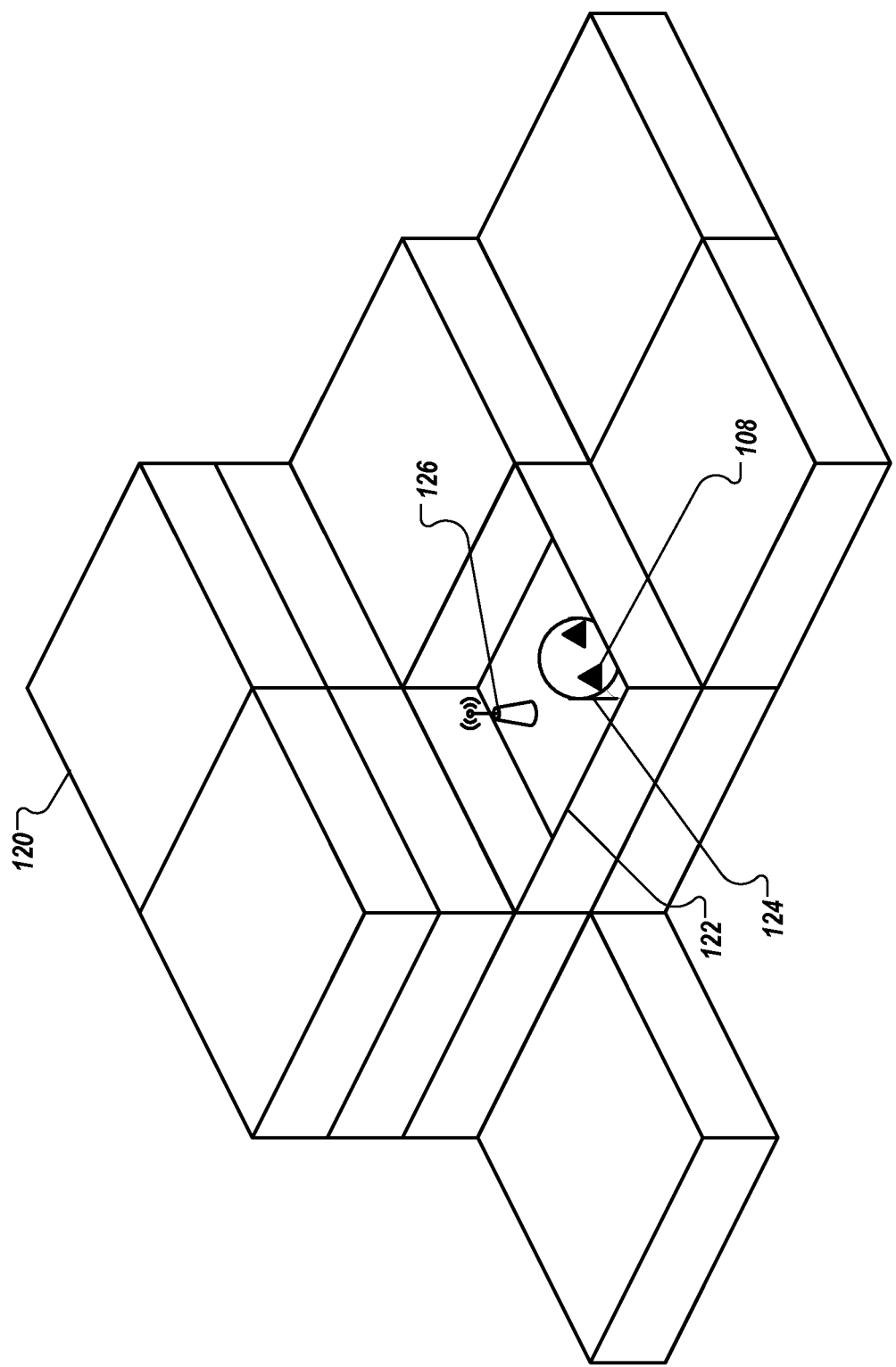
FIG. 1B illustrates techniques of managing a location database in a three-dimensional space.

FIG. 1B illustrates managing a location database in a three-dimensional space. Some location-aware mobile devices 108 (e.g., GPS-enabled devices) can identify locations in a three-dimensional space. The locations can be represented by latitude, longitude and altitude. Altitude can be expressed, for example, as elevation measured in meters from sea level. Locating a mobile device in a three-dimensional space can be desirable when an altitude of the mobile device is necessary for locating the mobile device. For example, altitude can be used to determine on which floor the mobile device is located in a high-rise building. Location of mobile device 108 in three-dimensional space can be displayed on a two-dimensional map with the elevation as an annotation, or on a three-dimensional map.

Mobile devices 108 can connect to access point 126. Mobile devices 108 can be location-aware mobile devices that can transmit their locations, including latitude, longitude, and altitude coordinates to the system. The system can calculate an average location based on the latitude, longitude, and altitude coordinates received from mobile devices 108. Three-dimensional space 124, having the average location as a center and an error margin as a radius, can be associated with access point 126. Space 124 can represent a space that a mobile device is likely to be located when the mobile device is located within a communication range of access point 126. In this specification, space 124 will be referred to as a presence space.

The system can send information on presence space 124 to mobile devices that are located within a communication range of access point 126. The mobile devices receiving the information can use the information to determine their geographic locations. The system can divide a three-dimensional geographic space into three-dimensional grid 120. Three-dimensional grid 120 can be composed of three-dimensional cells 122. Each three-dimensional cell 122 can have a base that corresponds to cell 102 of geographic grid 100. Each three-dimensional cell 122 can have a height (e.g., measured in meters) as a dimension. Presence space 124 can be referred to as being located in cell 122 if the center of presence space 124 is in cell 122. The system can limit the number of presence spaces in cell 122 based on a popularity of the presence space (e.g., how many connections are made from mobile devices 108 in presence space to access point 126), a stability of presence space 124 (e.g., how stable presence space 124 has been), a longevity of access point 126 (e.g., how long access point 126 has existed), and a freshness of presence space 124 (e.g., when was a latest location transmission from mobile device 108 located within a communication range of access point 126 was received).

The system can transmit information on presence space 124 and neighboring presence spaces based on three-dimensional cells 122 of three-dimensional grid 120 to a mobile device (e.g., mobile device 110) that is located within a communication range of access point 126. Mobile device 110 can use the information to estimate a current location of mobile device 110 in the three-dimensional space, and display the estimated current location on a three-dimensional map.

Server-Side Process and System for Managing a Location Database

Figure 2A:
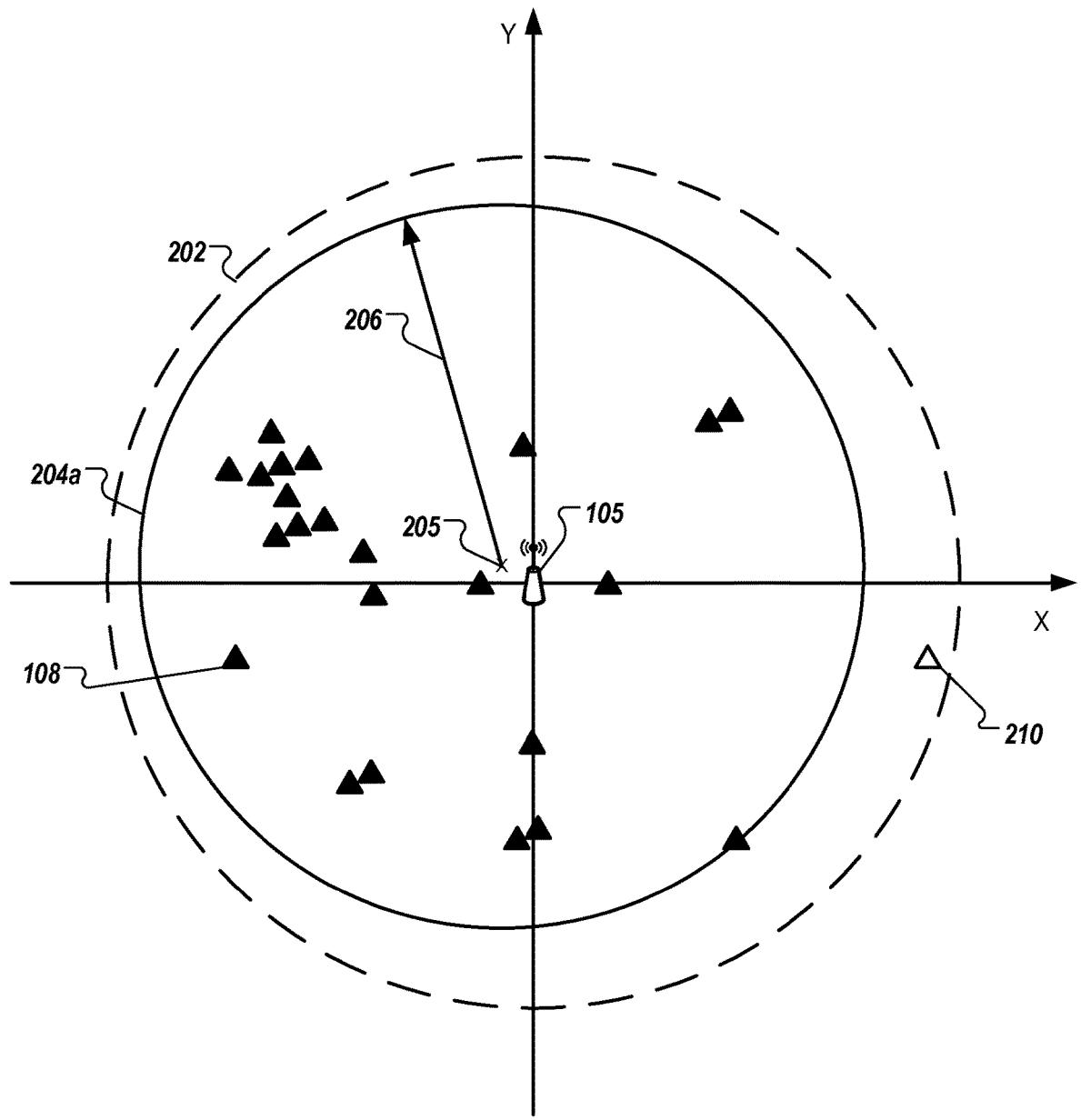
FIGS. 2A-2C illustrate exemplary stages of determining locations associated with access points in WLAN using mobile devices.
Figure 2B:
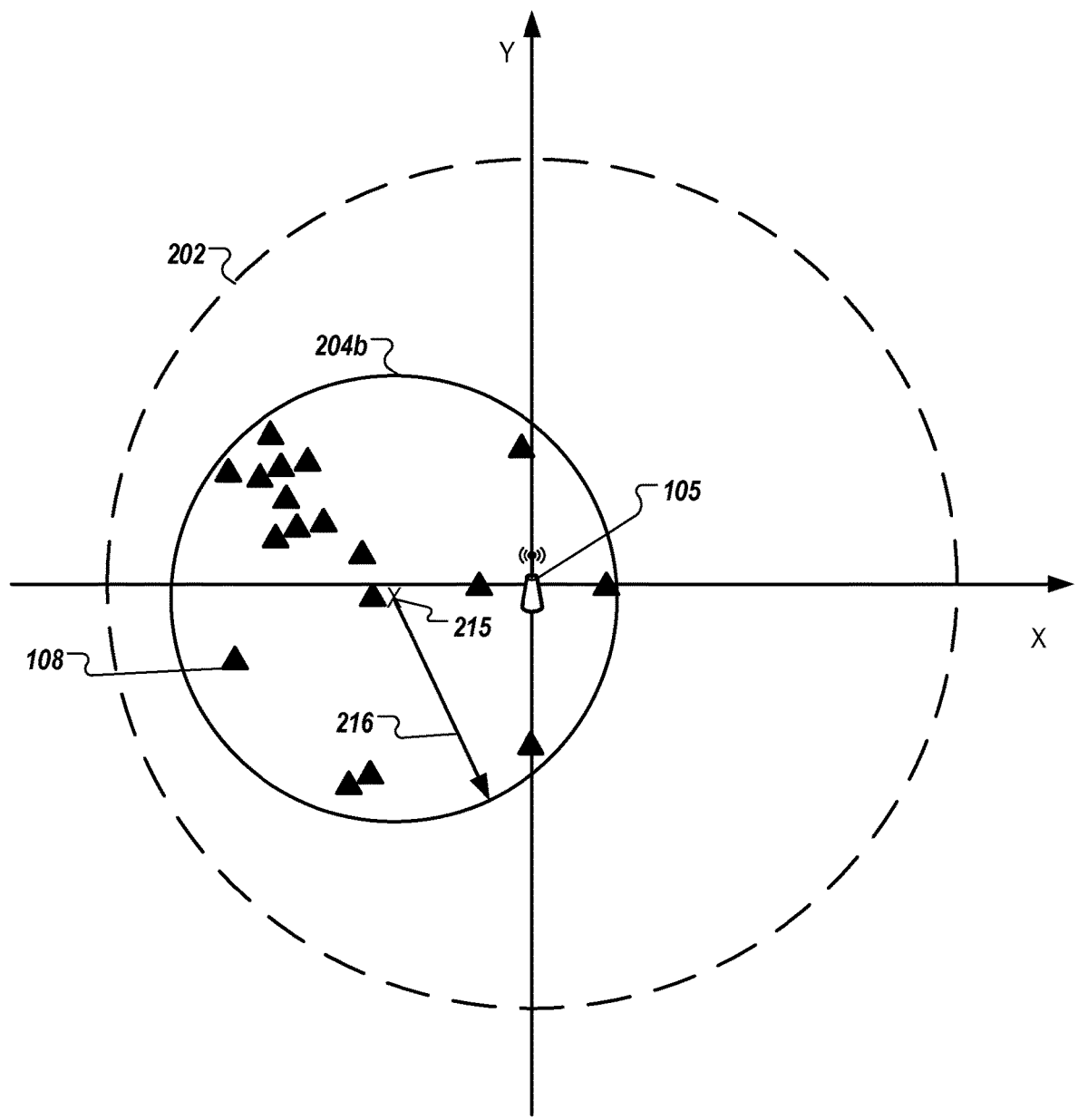
Figure 2C:
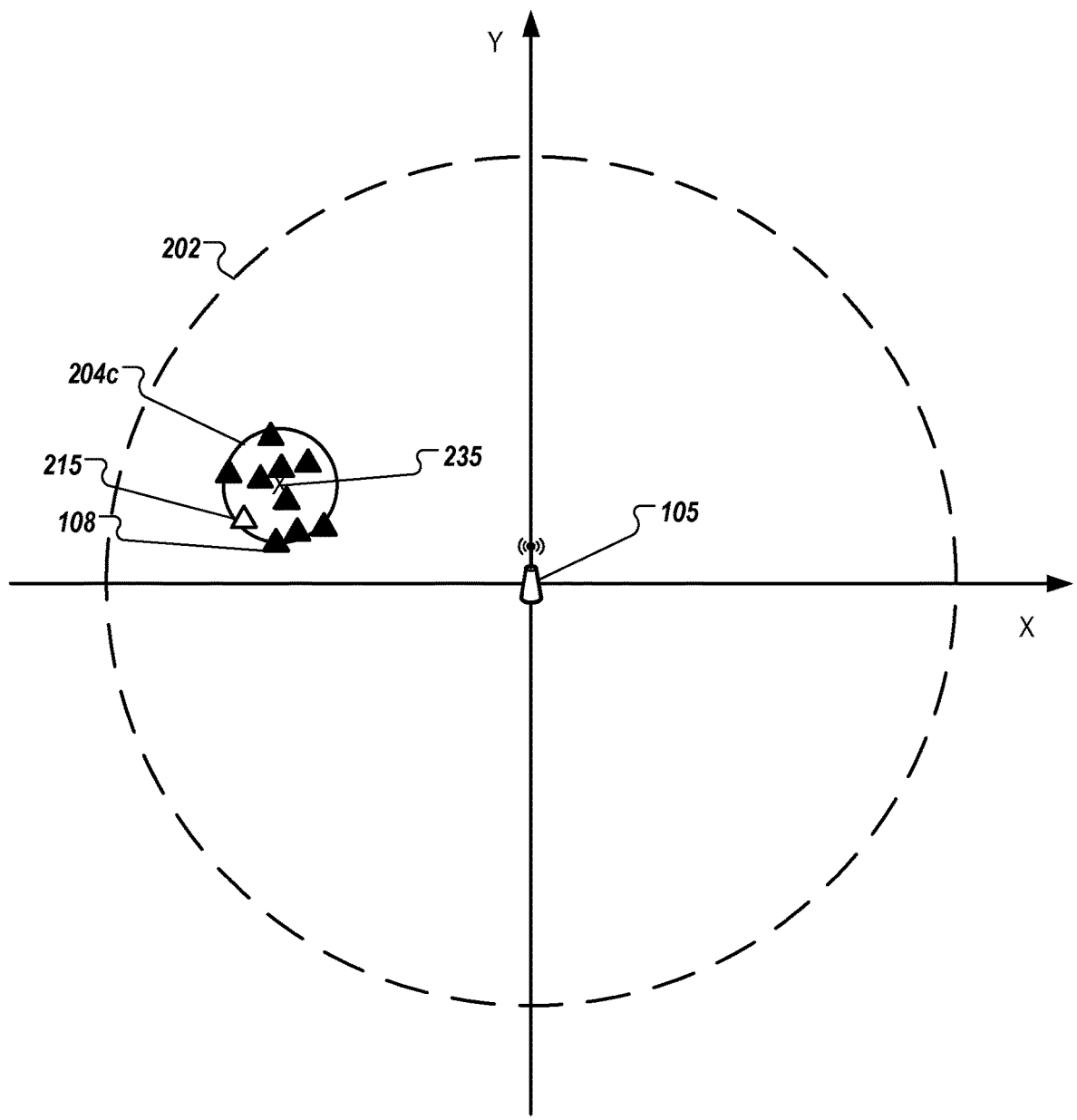

FIGS. 2A-2C illustrate exemplary stages of managing a location database. For convenience, the techniques will be described in reference to a network-based positioning system that includes a server that implements the techniques.

FIG. 2A illustrates an exemplary stage of a multi-pass analysis that can be used to determine a presence area associated with access point 105. Access point 105 can have a coverage area 202, which can be determined by signal strength of a transmitter of access point 105 and other factors (e.g., physical characteristics of geographic areas surrounding access point 105). Mobile devices 108 that are located within coverage area 202 can wirelessly connect to access point 105. Access point 105 can allow mobile devices 108 to connect to a wired network through various gateways. The wired network can include a data network (e.g., the Internet), a public switched telephone network (PSTN), other digital or analog networks, or a combination of the above.

Mobile device 108 can include location aware mobile devices (e.g., GPS enabled mobile devices). Each location aware mobile devices 108 (represented as black triangle of FIG. 2A) can detect its current geographic location. The current geographic location can be represented by latitude and longitude. When mobile devices 108 communicate with access point 105, mobile devices 108 can transmit location information to the system through access point 105. The location information can be associated with an identifier of access point 105 (e.g., a Media Access Control (MAC) address of access point 105). The system can use the location information received from multiple mobile devices 108 to determine the presence area that can be associated with access point 105. The presence area does not necessarily enclose a location where access point 105 is actually located. Neither is it necessary for the presence area to correspond to the geometric location or shape of coverage area 202, although the presence area can be located within coverage area 202.

Distribution of mobile devices 108 within coverage area 202 can correspond to a snapshot of mobile devices 108 at a particular time (e.g., 8:30 am local time for a time zone in which access point 105 is located). Each mobile device 108 can be associated with a single location. Distribution of mobile devices 108 with coverage area 202 can also correspond to locations of mobile devices 108 over a period of time (e.g., six hours from 4 am to 10 am). Each mobile device 108 can be associated with multiple locations (e.g., when mobile device 108 is moving). A single mobile device 108 that is associated with multiple locations can be represented by multiple locations in the system, as illustrated by multiple triangles in FIG. 2A.

The server can determine an average geographic location of a set of locations received from mobile devices 108. The set of locations can include locations received from mobile devices 108 at a particular time or during a particular time period. The average geographic location can be designated as center 205 of area encompassed by circle 204a. The center of circle 204a need not coincide with the location of access point 105. The server can calculate a distance between the average geographic location and each location in the set and identify one or more outliers. Outliers can be locations in the set that are located the farthest from the average geographic location. Outliers (e.g., location 210) whose distances to the center exceed a threshold can be excluded from the set. Circle 204a can have radius 206 that corresponds to the longest distance between the average geographic location and locations in a current set after the outliers are excluded.

FIG. 2B illustrates an exemplary stage of the multi-pass analysis subsequent to the stage of FIG. 2A. Locations whose distances to the average geographic location of FIG. 2A (center 205 of circle 204a) exceed a threshold have been excluded from the set. The threshold can be configured such that a percentage of positions (e.g., five percent of locations of FIG. 2A) are excluded. A new average geographic location can be calculated based on the locations remaining in the set (e.g., the 95 percent of locations remaining). The new average geographic location can be, for example, a center 225 of circle 204b. In various implementations, calculating the new average geographic location can include averaging the remaining locations in the set, selecting a medium geographic location in the set (e.g., by selecting a medium latitude or a medium longitude), or applying other algorithms. Algorithms for calculating the average geographic location can be identical in each pass of the multi-pass analysis, or be distinct from each other in each pass.

Area encompassed by circle 204b can be smaller than the area encompassed by circle 204a as determined in a prior pass when outlier locations are excluded. The smaller area can reflect an increased precision of the calculation. The center 225 of circle 204b does not necessarily coincide with center 205 of circle 204a. In some implementations, radius 216 of circle 204b can correspond to a remaining location of mobile device 108 that is farthest away from the center 225 of circle 204b. Radius 216 can represent an error margin of the new estimation the presence area calculated in the current pass.

FIG. 2C illustrates an exemplary final stage of the multi-pass analysis. When certain exit conditions are satisfied, the system can terminate the iterative process after the final stage. The final stage can produce a final average geographic location that corresponds to a cluster of positions of mobile devices 108. The final average geographic location can be represented as a center 235 of circle 204c. Circle 204c can have a radius that corresponds to a final error margin, which is based on a distance between the final average geographic location and a location in the cluster. Circle 204c can be designated as the presence area associated with access point 105 through and identifier (e.g., a MAC address) of access point 105.

The server can determine whether to include the identifier of access point 105 and associated presence area in a location database based on various factors. For example, the server can count the number of presence areas in cell 102 of geographic grid 100, and select a number of presence areas based on popularity, stability, and longevity. The server can send information of the presence areas (including presence area 204c if presence area 204c is selected) in the location database to a mobile device (e.g., mobile device 215), regardless whether mobile device 215 is GPS-enabled.

Figure 2D:
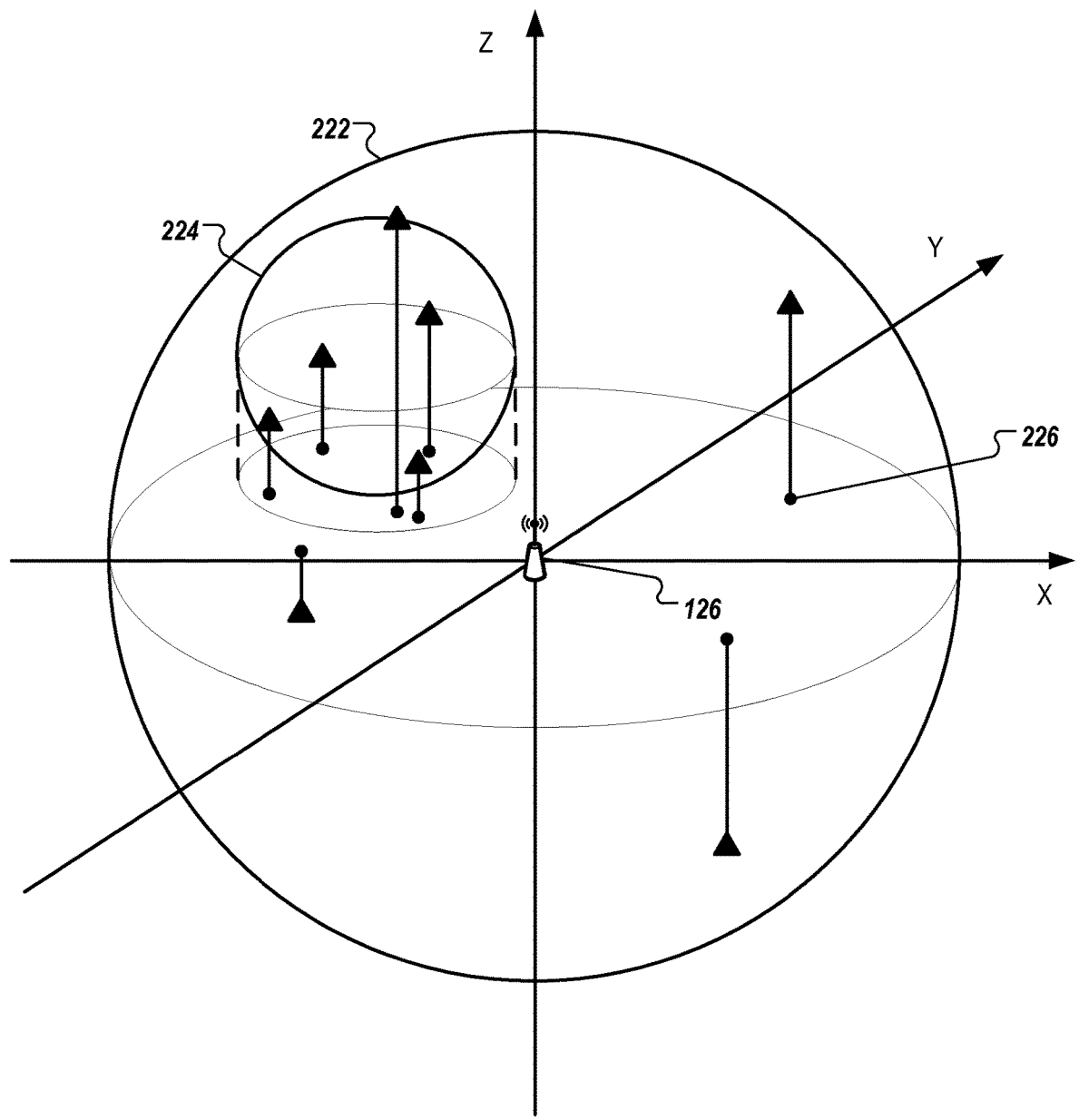
FIG. 2D illustrates an exemplary stage of determining locations associated with access points in WLAN using mobile devices in a three-dimensional space.

FIG. 2D illustrates an exemplary stage of managing a location database in a three-dimensional space. In FIG. 2D, axes X, Y, and Z can be used to indicate the three-dimensional space. For example, axes X, Y, and Z can represent longitude, latitude, and altitude, respectively. For convenience, location of access point 126 is shown to coincide with point zero on the X, Y, and Z-axes in FIG. 2D. In some implementations, an actual location (e.g., latitude, longitude, and altitude coordinates) of access point 126 is optional in the calculations.

Each triangle of FIG. 2D can represent a location of a mobile device located in the three-dimensional space. The locations can have projections (e.g., projection 226) on a plane in the three-dimensional space. The plane can be defined at arbitrary altitude (e.g., the altitude of access point 126). For example, axes X and Y can define the plane. Access point 126 can correspond to a coverage space 222, which can be determined by signal strength of access point 126 and other limiting factors (e.g., floors, ceilings, buildings in signal path).

A multi-pass analysis can associate a geographic space with access point 126 of a WLAN-based on a set of locations received from location-aware mobile devices 108 that are located in cell space 202. In a pass of the multi-path analysis, an average geographic location (e.g., center of space 224) can be determined by, for example, averaging the latitudes, longitudes, and altitudes coordinates of locations in the set. Distances between the average geographic location and locations in coverage space 222 can be calculated. Locations that are within coverage space 222 but are sufficiently far away from the average geographic location can be excluded from the set and from further computations. A radius of space 224 can be determined by, for example, the farthest distance between remaining locations in the set and the average geographic location.

The system can repeat the stages of calculating an average geographic location in a set, calculating distances between the average geographic location and the locations in the set, and excluding from the set locations based on the calculated distances. The repetition can continue until an exit condition is satisfied. A space having a center at the average geographic location and a radius that is based on a distance between the average geographic location and a remaining location in the set can be designated as a presence space that can be associated with access point 126.

Figure 3A:
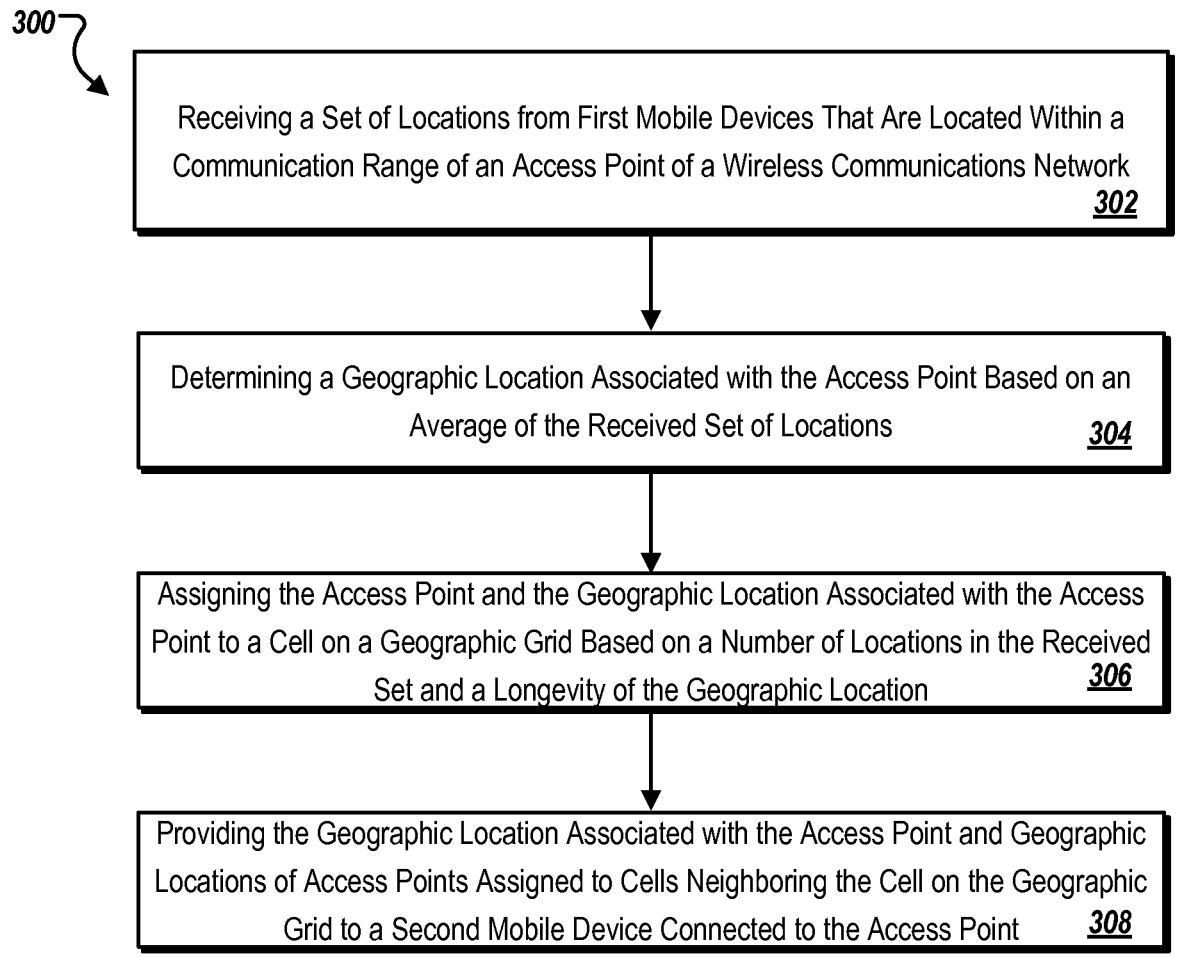
FIGS. 3A and 3B are flowcharts illustrating exemplary processes of determining locations associated with access points in WLAN using mobile devices.

FIG. 3A is a flowchart illustrating exemplary process 300 of managing a location database. Process 300 can be used, for example, to determine a presence area or presence space associated with an access point of the WLAN. The presence area or presence space can be used to determine a location of a non-GPS-enabled mobile device. For convenience, process 300 will be described in reference to a system that implements process 300.

The system can receive (302) a set of locations from one or more first mobile devices 108 located within a communication range of access point 105. Each location can be represented by a set of geographic coordinates (e.g., a latitude, a longitude, and an altitude). The location can be associated with an identifier (e.g., a MAC address) of access point 105. The identifier of access point can be automatically supplied by access point 105 when access point 105 communicates with the system. In various implementations, the set of locations can correspond to a period of time (e.g., 6 hours, or from 6 am to 10 am of a time zone in which access point 105 is located).

In some implementations, the period of time can be configured to reflect characteristics of specific usage patterns at various hours of a day. An area where mobile devices located within a communication range of access point 105 are most likely located can vary during the day, indicating various usage patterns in specific hours. For example, the period of time can correspond to "commute time," "business hours," "night time," etc. The characteristics of the time of the day can correspond to various usage patterns of mobile devices 108. For example, during commute time, the presence area associated with access point 105 can be at or near a freeway; during business hours, the presence area associated with access point 105 can be at or near an office building; at nighttime, the presence area associated with access point 105 can spread out without a particular point of concentration. The system can calculate the presence area based on locations received, for example, from 4 am to 10 am, and recalculate the presence area based on location received from 10 am to 4 pm, etc. Locations received in each characteristic time period can be grouped into a set in the system. The locations can be stored in any data structure (e.g., set, list, array, data records in a relational database, etc.) on a storage device coupled to the server.

The system can determine (304) a geographic location associated with access point 105 based on an average of the received set of locations. The geographic location can include a presence area or a presence space as described above. The presence area or presence space can be associated with access point 105 by, for example, the MAC address of access point 105. In some implementations, determining the geographic location can include applying a multi-pass algorithm on the received set of locations, including excluding at least one location from the set in each pass. Determining the geographic location can include applying the multi-pass algorithm periodically.

The system can assign (306) access point 105 and the geographic location associated with access point 105 to a cell (e.g., cell 102) on a geographic grid (e.g., geographic grid 100) based on various factors including popularity of access point 105, stability of the geographic location, and longevity of access point 105. In some implementations, popularity of access point 105 can measure how many mobile devices 108 are located within a communication range of access point 105. Popularity of access point can be measured by, for example, how many locations of mobile devices 108 that are located within a communication range of access point 105 are received in a period of time by the system.

Stability of the presence area associated with access point 105 can reflect how reliable the presence area is, if the presence area is used for estimating a location of a device located within a communication range of access point 105. Stability of the presence area associated with access point 105 can be measured by, for example, comparing the presence areas calculated by the last two calculations, and determine a degree of overlap between the presence areas. The higher the degree of overlap, the more stable the presence area.

Longevity of access point 105 can reflect the quality of the data associated with access point 105. For example, an access point that has been in the database for a longer time can be more reliable than an access point that has been recently added. Longevity of access point 105 can be measured by a history of data in a location database.

In some implementations, a freshness of data can also be used to determine whether the presence area associated with access point 105 will be assigned to cell 102 of geographic grid 100. The freshness of data can be measured by how long ago the system received the most recent location from mobile device 108.

The system can rank each presence area located in cell 102 of geographic grid 100 based on the popularity, stability, longevity, and freshness. At least a portion of all the presence areas located in cell 102 (e.g., three presence areas, including the presence area that is associated with access point 105) can be assigned to cell 102. Assigned access points and presence areas can be used for locating mobile devices (e.g., mobile devices 110) that are located within a communication range of access point 105. Unassigned presence areas can be stored in the location database for future use.

The system can provide (308) the geographic location associated with access point 105 to a second mobile device (e.g., mobile device 110) that is located within a communication range of access point 105. The system can further provide other geographic locations located in the same cell, as well as geographic locations associated with access points assigned to neighboring cells to the second mobile device. The locations can be transmitted from access point 105 to the second mobile device upon request or using various push or broadcast technologies.

In some implementations, the system can receive, process, and transmit three-dimensional location information. Presence spaces (e.g., presence space 124) can be assigned to three-dimensional cells (e.g., three-dimensional cell 122) on a geographic three-dimensional grid (e.g., three-dimensional grid 120). The locations can be transmitted from access point 126 to a second mobile device that is located within a communication range of access point 126 upon request or using various push or broadcast technologies.

Figure 3B:
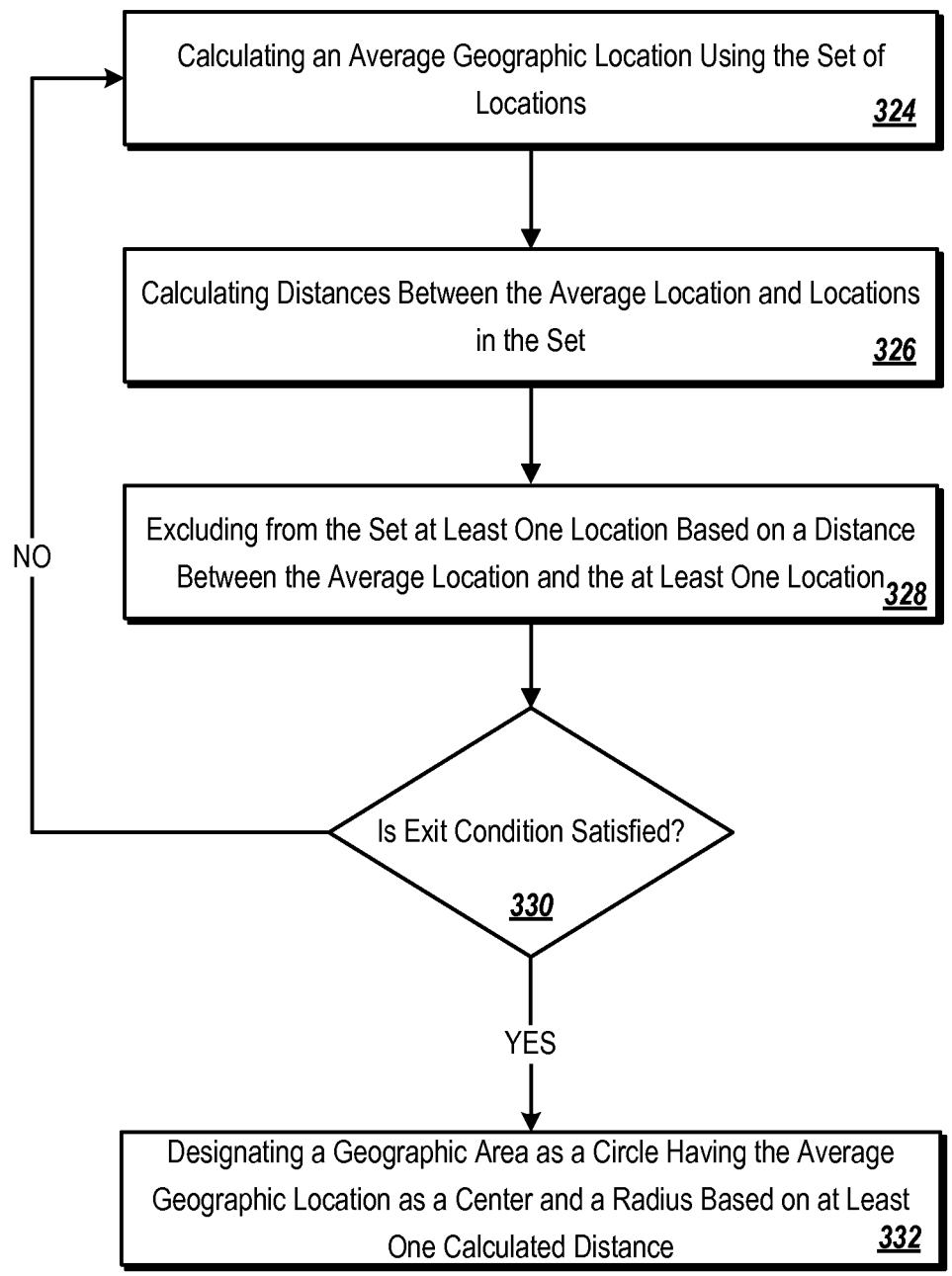

FIG. 3B is a flowchart illustrating an exemplary process 304 of calculating an average geographic location using a set of locations. For convenience, process 304 will be described in reference to a system that implements process 304.

The system can calculate (324) an average geographic location using the locations in the set. Calculating the average geographic location can include calculating an average of latitudes, longitudes, and altitudes of the locations in the set, and designating a position at the calculated average latitude, longitude, and altitude as the average geographic location. In some implementations, calculating the average geographic location can include designating a position at a median latitude, median longitude, and median altitude of the positions in the set as the average geographic location.

The system can calculate (326) distances between the locations in the set and the average geographic location. In some implementations, the system can calculate a linear distance between each of the locations in the set and the average geographic location in Euclidean space. In some implementations, the system can calculate a geodesic distance between each of the locations in the set and the average geographic location, taking curvature of the earth into consideration.

The distances calculated in stage 326 can be designated as a radius associated with a center. The center can be the average geographic location calculated in stage 324, which can be a center of a circle (e.g., circle 204a). The radius of the circle can be determined based on at least one distance between a location in the set of locations and the average geographic location. In some implementations, the radius can equal to the longest distance between the average geographic location and a location remaining in the set. In some implementations, the radius can be a distance that, when circle 106d is drawn using the radius and the average geographic location as a center, the circle can enclose a percentage (e.g., 80 percent) of the locations remaining in the set. The radius can represent a margin of error beyond which an estimation of a location of a non-GPS-enabled mobile device is less likely to be statistically meaningful.

The system can exclude (328) from the set at least one location based on a distance between the average location and the location. In some implementations, the system can exclude locations whose distance to the average geographic location exceeds a threshold distance. In each pass of the multi-pass analysis, the system can increase a precision of the estimated average geographic location by excluding locations that appear to be away from a concentration of locations (e.g., a cluster). A location that is away from a cluster of locations can be less useful in estimating the presence area associated with access point 105, and can be excluded. In various implementations, the threshold distance can vary from one pass to a next pass. In some implementations, the threshold distance can be a distance to the average geographic location within which a certain percentage (e.g., 95 percent) of locations in the set are located. In some implementations, the threshold distance can be a set of distances corresponding to the passes (e.g., 250 meters for the first pass, 150 meters for the second pass, etc.). The system can exclude at least one location from the set when the distance between the average geographic location and the location exceeds the threshold distance.

The system can repeat stages 324, 326, and 328 of process 304 until an exit condition is satisfied. The system can determine (330) whether an exit condition is satisfied for terminating the repetition. In some implementations, the exit condition can be satisfied when a number of repetitions reach a threshold number (e.g., 10 times). The threshold number, as well as the percentage of locations to exclude, can be configurable to fine tune a balance between certainty (e.g., a larger presence area can result in more confidence that a mobile device in the cell is actually located in the presence area) and precision (e.g., a smaller presence area can result in more accurate location of a mobile device). For example, when the percentage is set to 95 percent and the number of passes is set to 10, the final pass can produce a circle that encompasses about 60 percent of all location data points.

In some implementations, the exit condition of stage 330 can be satisfied when the presence area or presence space is sufficiently small. In cells where mobile devices are highly concentrated, a presence area can be sufficiently small that further passes will not necessarily increase the precision. The repetition of stages 324, 326, and 328 can terminate when the radius of the circle reaches below a threshold radius. For example, the threshold radius can be 8-10 meters. The threshold radius can differ from access point to access point, based on the distribution pattern of the locations in the set received (e.g., number of location data points received, density of the location data points, and concentration areas in the cells).

The system can designate (332) the geographic area as a circle having the average geographic location as a center and a radius based on at least one calculated distance. The geographic area can be associated with an access point (e.g., access point 105). The server can provide the geographic area (e.g., the center and radius) to a mobile device for calculating a current location of the mobile device. The center can be represented in latitudes and longitudes. In some implementations where distances are calculated in three-dimensional spaces, the center can further be represented in an altitude.

Figure 3C:
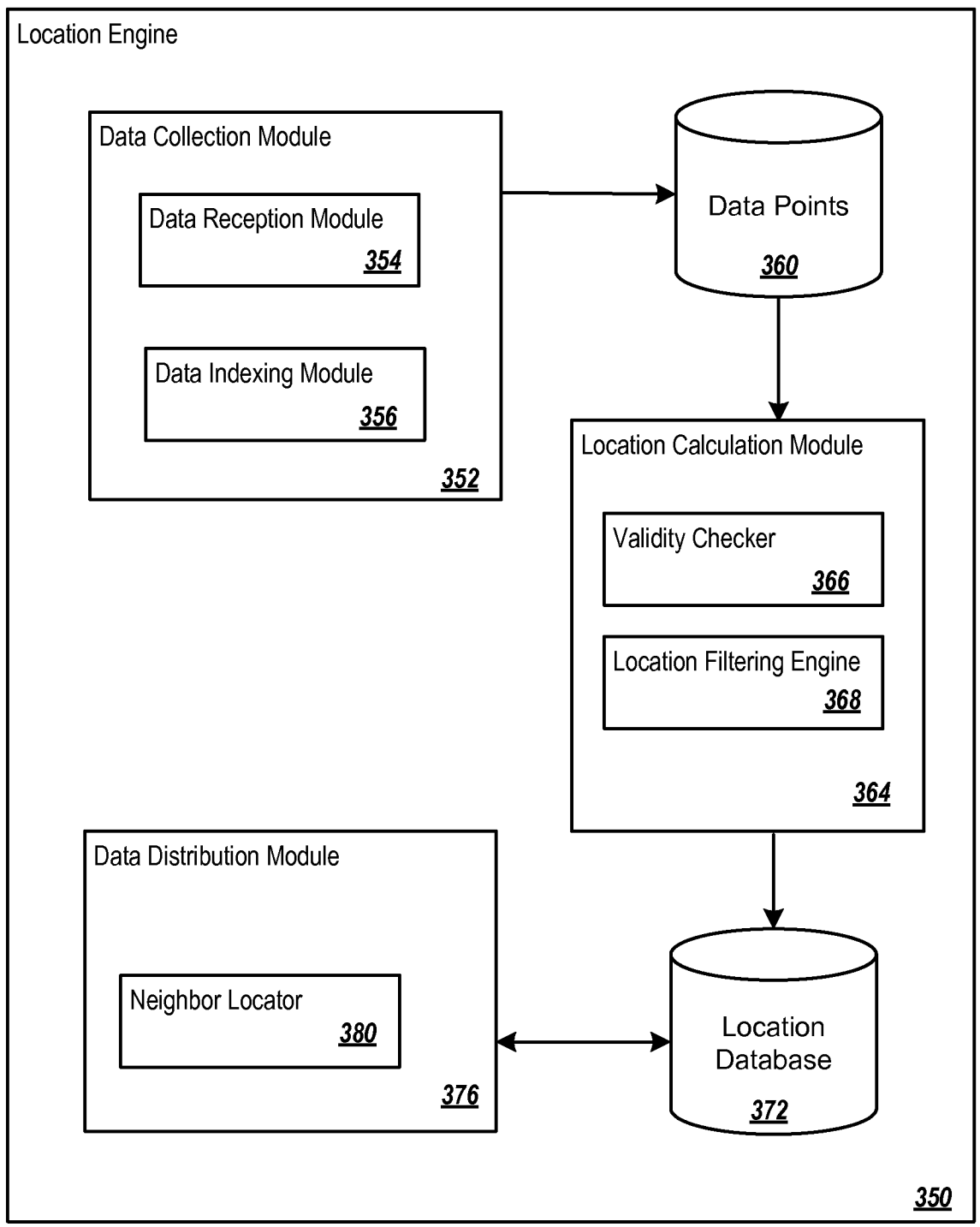
FIG. 3C is a block diagram illustrating an exemplary system implementing techniques of managing a location database.

FIG. 3C is a block diagram illustrating an exemplary system implementing techniques of managing a location database. The system can include one or more processors, one or more memory devices storing instructions, and other hardware or software components. The system can include location engine 350 that can be used to determine a presence area or presence space to be associated with an access point (e.g., access point 105).

Location engine 350 can include data collection module 352 that can receive data from various mobile devices through various access points. The data can include multiple data points that can indicate locations of one or more location-aware mobile devices (e.g., mobile devices 108) as well as identifiers of access points (e.g., MAC addresses of access points 105) indicating to which access point mobile devices 108 are connected. In some implementations, the data points can also include information on which time zone mobile devices 108 are located. Data collection module 352 can include data reception module 354, which can receive data transmitted from mobile devices 108 and data indexing module 356. Data indexing module 356 can perform various processing on the received data points. For example, data indexing module 356 can sort latitudes, longitudes, and altitudes based on cell IDs. Data indexing module 356 can also group data into sets based on time periods. For example, a new set of received locations can be created for a configurable period of time (e.g., six hours).

Sets of received locations of mobile devices 108 can be stored in data point database 360. Data point database 360 can store current and historical locations of various mobile devices 108. Data point database 360 can include an ad-hoc database, relational database, object-oriented database. Data point database 360 can be hosted locally or remotely in relation to location engine 350.

Location calculation module 364 can be utilized to calculate an average geographic location in sets of data points in data points database, calculate distances between the average geographic location and locations of various data points, and exclude locations from the sets for further computation. Location calculation module 364 can perform the calculations for a particular set (e.g., a set of data points associated with a cell ID) until an exit condition is reached for the particular set. Location calculation module 364 can determine presence areas or presence spaces for each access point (e.g., access point 105)

In some implementations, location calculation module 464 can perform validity checks on the presence areas or presence spaces based on various criteria and various data in the data points using validity checker 366. For example, the data points received from mobile devices 108 can include Mobile Country Codes (MCCs) and time zone information. Validity checker 366 can compare a calculated presence area or presence space with polygons corresponding to countries represented by the MCCs and polygons corresponding to the time zones. If a calculated presence area or presence space is located outside the polygons, validity checker 366 can register an anomaly and remove the access point.

Location filtering engine 368 can determine whether a presence area or presence space can be used to estimate a location of a mobile device that is currently located within a communication range of an access point. Location filtering engine 368 can divide a geographic region into cells 102 of geographic grid 100, or three-dimensional cells 122 of three-dimensional grid 120. Location filtering engine 368 can rank presence areas or presence spaces based on popularity, stability, longevity, and freshness. Location filtering engine 368 can assign the top-ranked presence areas or presence spaces located in each cell 102 or three-dimensional cell 122 to cell 102 or three-dimensional cells.

Presence areas and presence spaces can be defined by a center having the average latitude, longitude, and altitude coordinates of the set of locations. Presence areas and presence spaces can be further defined by a radius determined based on distances from locations in the set of locations to the center. The latitude, longitude, and altitude of centers for the presence areas and presence spaces and the radii of the presence areas and presence spaces can be stored in location database 372. Location database 372 can store both assigned and unassigned presence areas and presence spaces. Unassigned presence areas or presence spaces can be assigned in subsequent calculations by location calculation module 364. Location database 372 can be updated periodically by location calculation module 364.

The data of location database 372 can be distributed to mobile devices using data distribution module 376. Data distribution module 376 can send information of assigned presence areas and presence spaces (e.g., center coordinates and radii) that is associated with access points to mobile devices (e.g., non-GPS-enabled mobile device 110) upon request, through broadcasting, or using various push technology without receiving requests from the mobile devices.

In some implementations, data distribution module 376 can send multiple presence areas and presence spaces to mobile devices in one transmission session. To reduce the number of location transmissions to the mobile devices that can consume communication bandwidths of the mobile device, data distribution module 376 can use neighbor locator 378 to locate cells that neighbors of the cell in which mobile device 110 is located. Neighboring cells can include, for example, a number of cells surrounding the cell in which mobile device 110 is located such that the total area of the cell and the surrounding cells cover a certain geographic area (e.g., one or two squire kilometers). Sending information on presence areas and presence spaces associated with multiple cells (e.g., 400 cells) to mobile device 110 can reduce the number of transmissions when mobile device 110 moves across cells. In such implementations, data distribution module 376 only needs to send an update to mobile device 110 when mobile device 110 moves out of all cells previously sent.

Process for Determining Locations of Mobile Devices Using a Location Database

Figure 4A:
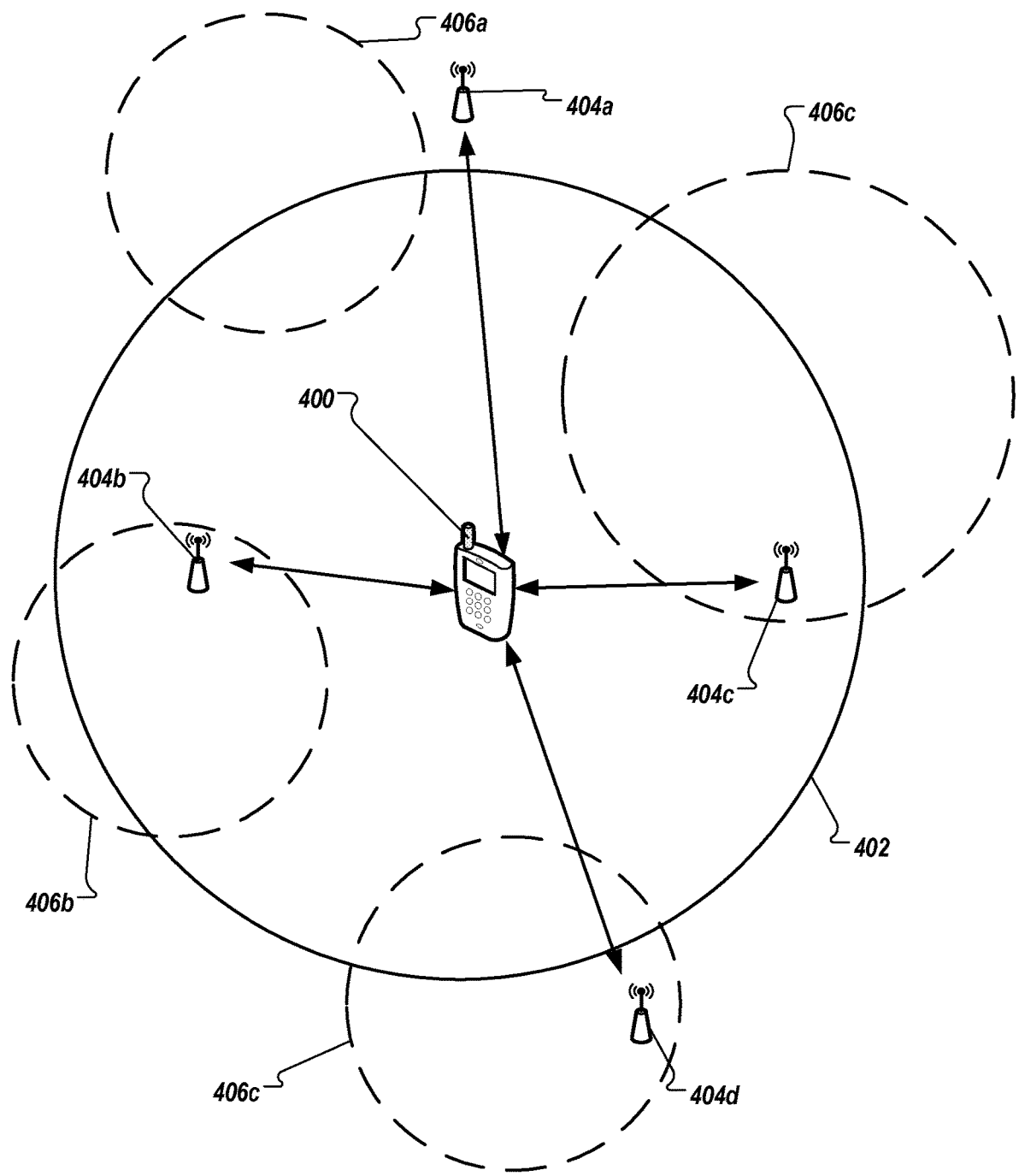
FIG. 4A illustrates techniques for determining locations of mobile devices using a location database in a network-based positioning system.

FIG. 4A illustrates techniques for determining locations of mobile devices using locations of wireless access points. Mobile device 400 can be an exemplary mobile device that can use locations of wireless access points to determine its location. An exemplary section of a communication network that includes access points 404a, 404b, 404c, and 404d is illustrated.

Mobile device 400 can be located within a communication range of access point 404a. From access point 404a, mobile device 400 can receive data that includes information on presence areas or presence spaces (including presence areas 406) of neighboring access points. Mobile device 400 can store the received data in a location database. The location database can be hosted on a storage device of mobile device 400. The stored data can be updated periodically or upon request.

In the example shown, mobile device 400 is located within a communication range of access point 404a. In addition, mobile device 400 is within communication ranges to access points 404b, 404c, and 404d. Mobile device 400 can identify access points 404a, 404b, 404c, and 404d under wireless communication protocols used in the WLAN (e.g., IEEE 802.11a). Access points 404*a*, 404*b*, 404*c*, and 404*d* can be identified by MAC addresses of the access points or other identifiers (e.g., Bluetooth™ identifiers).

Mobile device 400 can identify presence areas 406*a*, 406*b*, 406*c*, and 406*d* that are associated with access points 404*a*-*d*, respectively. Identifying presence areas 406*a*-*d* can include retrieving information on the presence areas 406*a*-*d* from a memory device coupled to mobile device 400. In some implementations, mobile device 400 can request from a server the presence areas 406*a*-*d* by sending to the server identifiers of access points 404*a*-*d*.

Based on presence areas 406*a*-*d*, mobile device 400 can execute an iterative process (e.g., a multi-pass analysis) on the presence areas 406*a*-*d*. The iterative process can produce geographic area 402, which can be an estimate of mobile device 400's current geographic location. Geographic area 402 can be a geographic space when three-dimensional location information is utilized. Mobile device 400 can display the estimated current location on a display device (e.g., on a map display).

Figure 4B:
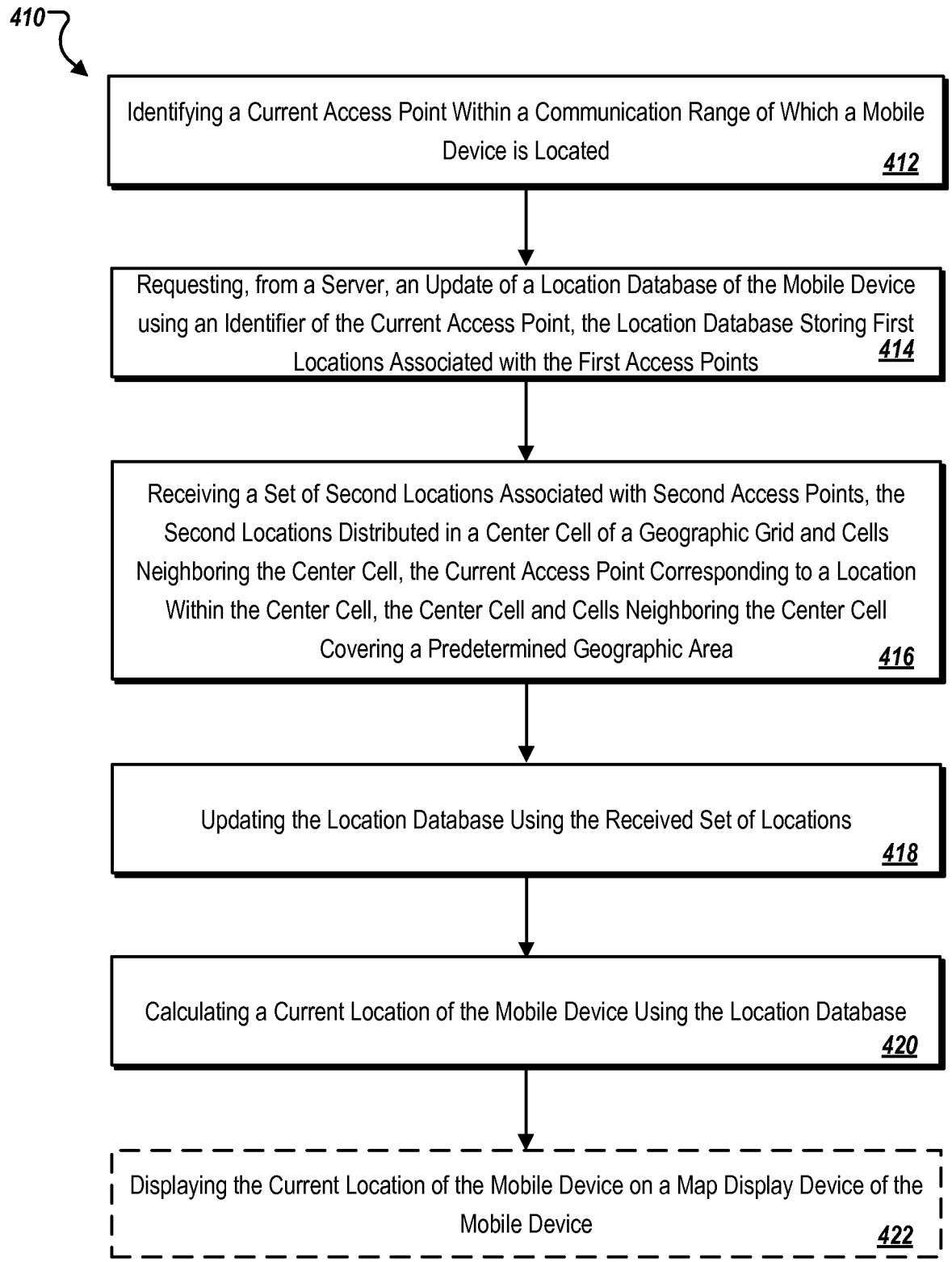
FIG. 4B is a flowchart illustrating an exemplary process of determining a location of a mobile device using a location database.

FIG. 4B is a flowchart illustrating exemplary process 410 of determining a location of a mobile device using a location database. For convenience, process 410 will be described in reference to mobile device 400 that implements process 410.

Mobile device 400 can identify (412) a current access point within a communication range of which mobile device 400 is located. Mobile device 400 can use the current access point to determine whether to request an update of a location database that is hosted on mobile device 400. The location database hosted on mobile device 400 can include records of access points previously downloaded to mobile device 400. The records in the location database hosted on mobile device 400 can include identifiers of access points (e.g., MAC addresses) and corresponding locations (e.g., latitude/longitude coordinates).

In stage 412, mobile device 400 can determine whether the current access point is included in the records of the location database. Mobile device can perform a lookup of the location database using an identifier (e.g., a MAC address) of the current access point within a communication range of which mobile device 400 is located. If the current access point is included in the records of the location database, mobile device can determine that the location database is up-to-date. If the current access point is not included in the records of the location database, mobile device 400 can determine that the location database needs update.

Mobile device 400 can request (414) from a server an update of the location database of mobile device 400 using the identifier of the current access point. The records in the location database, including identifiers and locations of access points, can be refreshed using new identifiers and locations of new access points. Mobile device 400 can send the identifier of the current access point to the server. The server can identify a cell as a center cell in a geographic grid. A center cell can be a cell that includes a location associated with the identifier of the current access point to the server, and sends all access point locations in the cell and in neighboring cells to mobile device 400. The server can use the center cell as a starting point to locate neighboring cells. While the center cell can be an anchor of a group of cells including the center cell and the neighboring cells, the center cell is not required to be located at an exact geographic center of the group of cells. For example, the center cell can be a cell located on an oceanfront, where all neighboring cells can be located on one side of the center cell.

Mobile device 400 can receive (416) a set of second locations associated with second access points. The second access points can be distributed in the center cell and cells neighboring the center cell on the geographic grid. The location associated with the current access point (e.g., a center of a circular area) can be located in the center cell. The neighboring cells can be cells that are located next to or closest to the center cell on the geographic grid. The number of neighboring cells can have a value such that the center cell and the neighboring cells can cover a predetermined geographic area (e.g., 1.5 square kilometers). Identifiers of the access points and locations associated with the access points can be included in the update when the locations associated with the access points are within the geographic area covered by the center cell and the neighboring cells. One exemplary advantage of updating the location on mobile device 400 when the current access point is not included in the records of the location database is that when mobile device 400 moves from cell to cell, no update is necessary until mobile device 400 moves out of a large area compared to the coverage area of a single access point. Thus, frequent updates can be avoided, saving resources both for mobile device 400 (e.g., bandwidth, CPU cycle, battery power) and server (e.g., the server does not need to send frequent updates to a large number of mobile devices when the devices move from one street block to next).

Mobile device 400 can update (418) the location database hosted on mobile device 400 using the received set of locations and identifiers of access points. The update can "center" mobile device 400 at the geographic area covered by the center cell and the neighboring cells. Mobile device 400 may not need to request another update until mobile device 400 moves from the center cell to a cell not covered by one of the neighboring cells. For example, if each cell is approximately 50 meters by 50 meters, and the predetermined geographic area is 1.5 square kilometers, each update can inject approximately 600 cells into the location database of mobile device 400. Mobile device 400 may not need to request another update unless mobile device moves out of the area covered by the 600 cells.

Mobile device 400 can calculate (420) a current location of mobile device 400 using the location database hosted on mobile device 400. The calculation can be performed using an adaptive multi-pass process executed by mobile device 400. Further details of the multi-pass process will be described below with respect to FIG. 4C. Although other factors (e.g., signal strength from various access points) can assist the calculation of the current location, those factors are not required in the calculation.

Mobile device 400 can optionally display (422) the current location of mobile device 400 on a map display device of mobile device 400. Example display of the current location will be described in further detail below, with respect to FIG. 5.

Figure 4C:
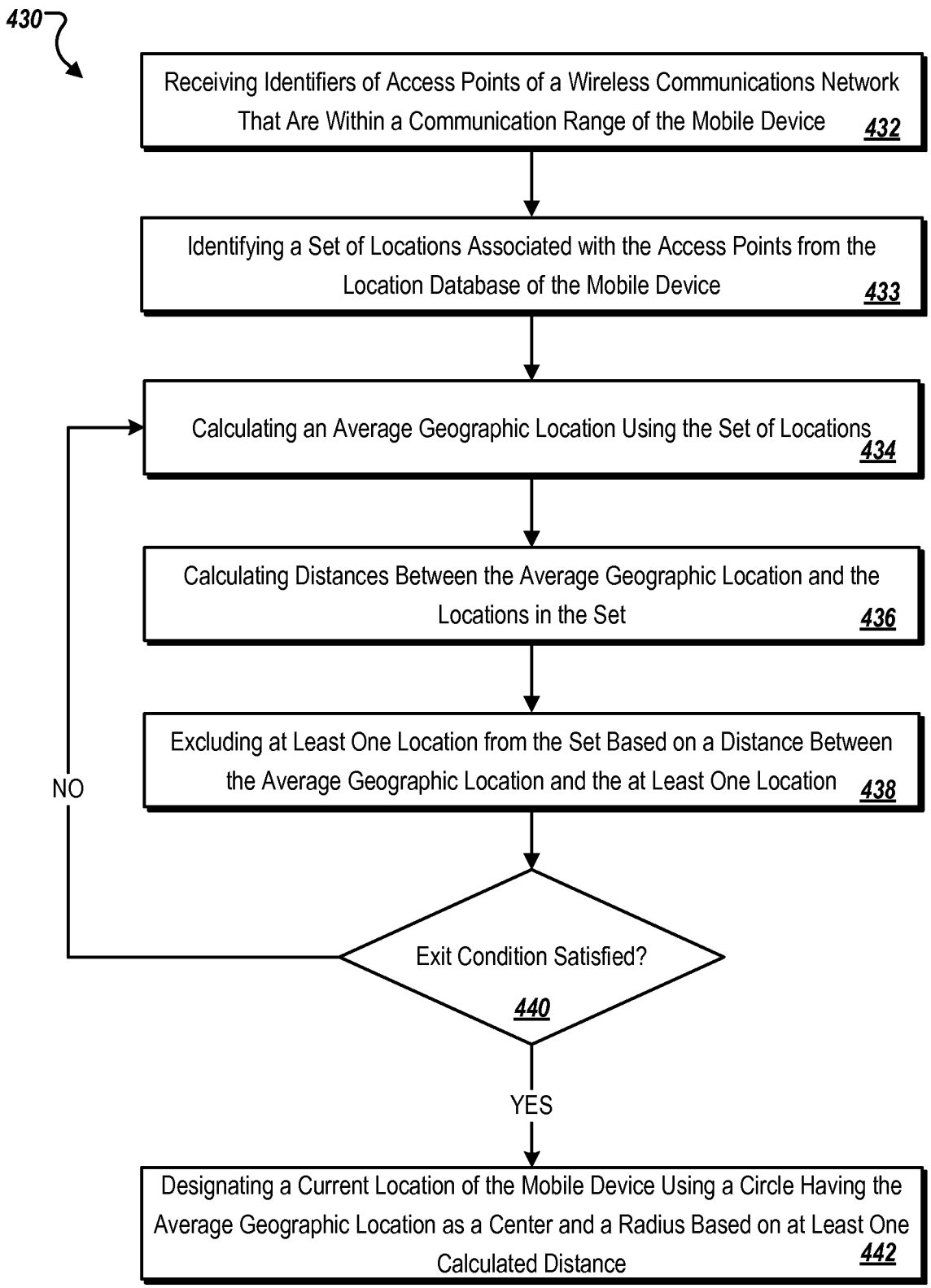
FIG. 4C is a flowchart illustrating an exemplary adaptive multi-pass process of determining a location of a mobile device.

FIG. 4C is a flowchart illustrating exemplary adaptive multi-pass process 430 of determining a location of a mobile device. For convenience, process 430 will be described in reference to mobile device 400 that implements process 430.

Mobile device 400 can receive (432) identifiers of access points (e.g., access points 404) of a wireless communication network (e.g., a WLAN). The access points can be located within a communication range of mobile device 400. The identifiers need not be associated with access points to which mobile device 400 is connected or can connect. For example, at a particular location, mobile device 400 can be within communication range of between three to 20 access points. Mobile device 400 may be capable of connecting to only two of the access points (due to, for example, security settings of the access points and mobile device 400). Mobile device 400 may be actively connected to only one of the two access points, or no access point at all. However, all identifiers of the access points received by mobile device 400 can be used in the calculation.

Mobile device 400 can identify (433) a set of locations associated with the access points from the location database of mobile device 400. The set of locations can correspond to presence areas 406 or presences spaces associated with the access point. Each location can be represented by geographic coordinates (e.g., latitude, longitude, and altitude). Each location can be associated with an identifier (e.g., a MAC address) of an access point 404. Mobile device 400 can identify the locations using a database lookup.

Mobile device 400 can calculate (434) an average geographic location using the locations in the set. Calculating the average geographic location can include calculating an average of latitudes, longitudes, and altitudes of the locations in the set, and designating a position at the calculated average latitude, longitude, and altitude as the average geographic location. In some implementations, calculating the average geographic location can include designating a location at a median latitude, median longitude, and median altitude of the positions in the set as the average geographic location.

Mobile device 400 can calculate (436) distances between the locations in the set and the average geographic location. In some implementations, the system can calculate a linear distance between each of the locations in the set and the average geographic location in Euclidean space. In some implementations, the system can calculate a geodesic distance between each of the locations in the set and the average geographic location, taking curvature of the earth into consideration.

The distances calculated in stage 436 can be designated as a radius associated with a center. The center can be the average geographic location calculated in stage 434, which can be a center of a circle (e.g., circle surrounding geographic area 402). The radius of the circle can be determined based on at least one distance between a location in the set of locations and the average geographic location. In some implementations, the radius can equal to the longest distance between the average geographic location and a location remaining in the set. In some implementations, the radius can be a distance that, when a circle is drawn using the radius and the average geographic location as a center, the circle can enclose a percentage (e.g., 80 percent) of the locations remaining in the set. The radius can represent a margin of error beyond which an estimation of a location of a non-GPS-enabled mobile device is less likely to be statistically meaningful.

Mobile device 400 can exclude (438) from the set at least one location based on a distance between the average location and the location. In some implementations, the system can exclude locations whose distance to the average geographic location exceeds a threshold distance. In each pass of the multi-pass analysis, the system can increase a precision of the estimated average geographic location by excluding locations that appear to be away from a concentration of locations (e.g., a cluster). A location that is away from a cluster of locations can be less useful in estimating a current location of mobile device 400, and can be excluded. In various implementations, the threshold distance can vary from one pass to a next pass. For example, the threshold distance can be a set of distances corresponding to the passes (e.g., 50 meters for the first pass, 30 meters for the second pass, etc.). The system can exclude at least one location from the set when the distance between the average geographic location and the location exceeds the threshold distance.

In some implementations, mobile device 400 can determine a threshold percentage of locations to be excluded. The threshold percentage can have a pre-specified value (e.g., five percent). In each pass, mobile device 400 can exclude the threshold percentage of locations that are located farthest from the average geographic location.

Mobile device 400 can repeat stages 434, 436, and 438 of process 430 until an exit condition is satisfied. The system can determine (440) whether an exit condition is satisfied for terminating the repetition. In some implementations, the exit condition can be satisfied when a number of repetitions reach a threshold number (e.g., five times). The threshold number can relate to a number of locations in the originally received set. The threshold number, as well as the percentage of locations to exclude, can be configurable to fine tune a balance between certainty (e.g., a larger presence area can result in more confidence that a mobile device in the cell is actually located in the presence area) and precision (e.g., a smaller presence area can result in more accurate location of a mobile device). For example, when the percentage is set to 95 percent and the number of passes is set to 10, the final pass can produce a circle that encompasses about 60 percent of all location data points.

In some implementations, the exit condition of stage 330 can be satisfied when the presence area or presence space is sufficiently small. In areas where access points 404 are highly concentrated, an estimated current location can include an area sufficiently small that further passes will not necessarily increase the precision. The repetition of stages 434, 436, and 438 can terminate when the radius of the circle reaches below a threshold radius. For example, the threshold radius can be 8-10 meters. The threshold radius can be based on radii of presence areas 406. In some implementations, if some radii of presence areas 406 are sufficiently small, the threshold radius can be small, to reflect a confidence on the estimate.

Mobile device 400 can designate (442) the current location of mobile device 400 using a circle having the average geographic location as a center and a radius based on at least one calculated distance. The center can be represented in latitudes and longitudes. In some implementations where distances are calculated in three-dimensional spaces, the center can further be represented in an altitude. In some implementations, mobile device can further display the current location on a display device on a map user interface.

Overview of Location Estimation Using a Probability Density Function

Figure 5:
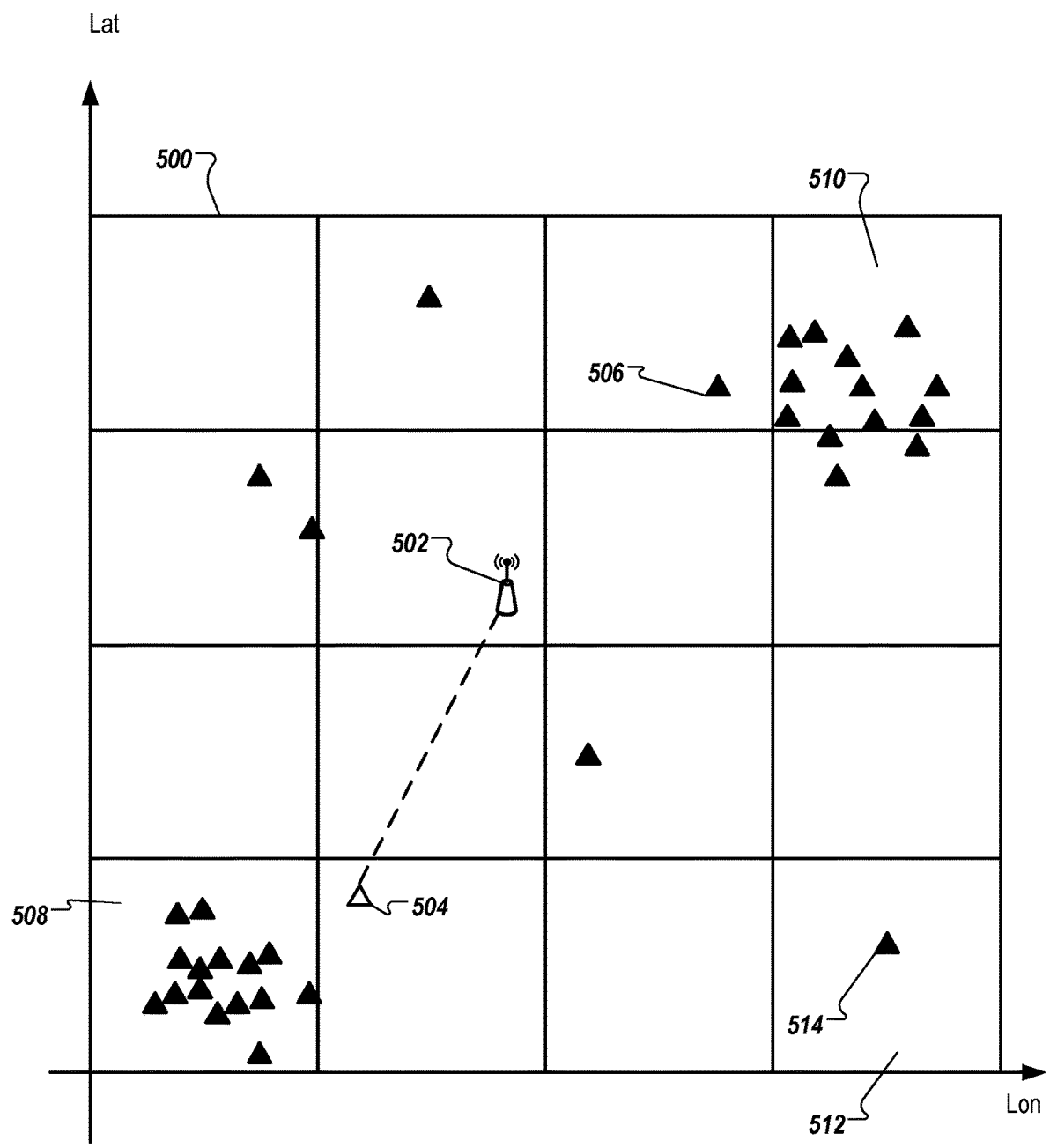
FIG. 5 is a diagram providing an overview of exemplary techniques of location estimation using a probability density function.

FIG. 5 is a diagram providing an overview of exemplary techniques of location estimation using a probability density function. A system performing location estimation can apply a probability density function on data of location points distributed on geographic grid 500 to estimate an effective location of wireless access gateway 502.

An effective location of wireless access gateway 502 is a calculated location of wireless access gateway 502 that can be used to calculate a location of mobile device 504 being located within a communication range of wireless access gateway 502. The effective location can indicate a likely location of mobile device 504. The effective location can include latitude, longitude, and altitude coordinates. The coordinates can be associated with an uncertainty value, which can indicate an accuracy of the coordinates. The effective location can, but often does not, coincide with a physical location of wireless access gateway 502.

The system can harvest data from multiple location-aware devices 506. Each of the location-aware devices 506 can be configured to transmit a current location to the system anonymously. The current location can include a detected latitude, longitude, and altitude of the location-aware devices 506. The location can be associated with an identifier of wireless access gateway 502. The identifier can include, for example, a cell identifier of wireless access gateway 502 when wireless access gateway 502 is a cell tower, or a media access control (MAC) address when wireless access gateway 502 is a wireless access point or a Bluetooth™ device. The location can be associated with additional information relating to communication between a mobile device and wireless access gateway 502. The additional information can include, for example, a received signal strength indication (RSSI), bit error rate information, or both. A data point in the harvested data can include the location, the identifier, and the additional information. In FIG. 5, each triangle indicates a harvested data point.

The system can use grid 500 to identify geographic regions in which received locations of location-aware devices 506 are concentrated. Grid 500 can be a geographic area associated with wireless access gateway 502 that includes multiple tiles of geographic regions. Each tile can correspond to a bin into which the harvested data points can be put. Each bin is a unit in grid 500 for which a probability distribution can be calculated. Grid 500 can include multiple bins. The system can generate a histogram representing a distribution of the locations in the harvested data based on the bins of grid 500. The system can select one or more bins (e.g., bins 508 and 510) based on a probability density function. The probability density function can include a sufficient statistic of the received set of location coordinates for calculating an effective location of wireless access gateway 502. The sufficient statistic can include a representation of the harvested data that retains properties of the harvested data. The sufficient statistic can include a likelihood technique that allows the system to model how well the system performs on summarizing the location coordinates in the harvested data for calculating the location of wireless access gateway 502. The system can use the sufficient statistic to create a parameter that summarizes the characteristics of the harvested data.

The system can exclude one or more bins (e.g., bin 512) that include locations considered outliers by the system. An outlier can be an improbable measurement unrepresentative of the harvested data. The system can identify outlier 514 by identifying a location that is statistically distant from other locations in the harvested data. When a bin is excluded, the system can ignore the data points in the bin when calculating an effective location of wireless access gateway 502.

The system can determine an effective location of wireless access gateway 502 based on sets of locations in the selected bins 508 and 510. The system can send the effective location and effective locations of other wireless access gateways to mobile device 504 for determining a location of mobile device 504.

Figure 6:
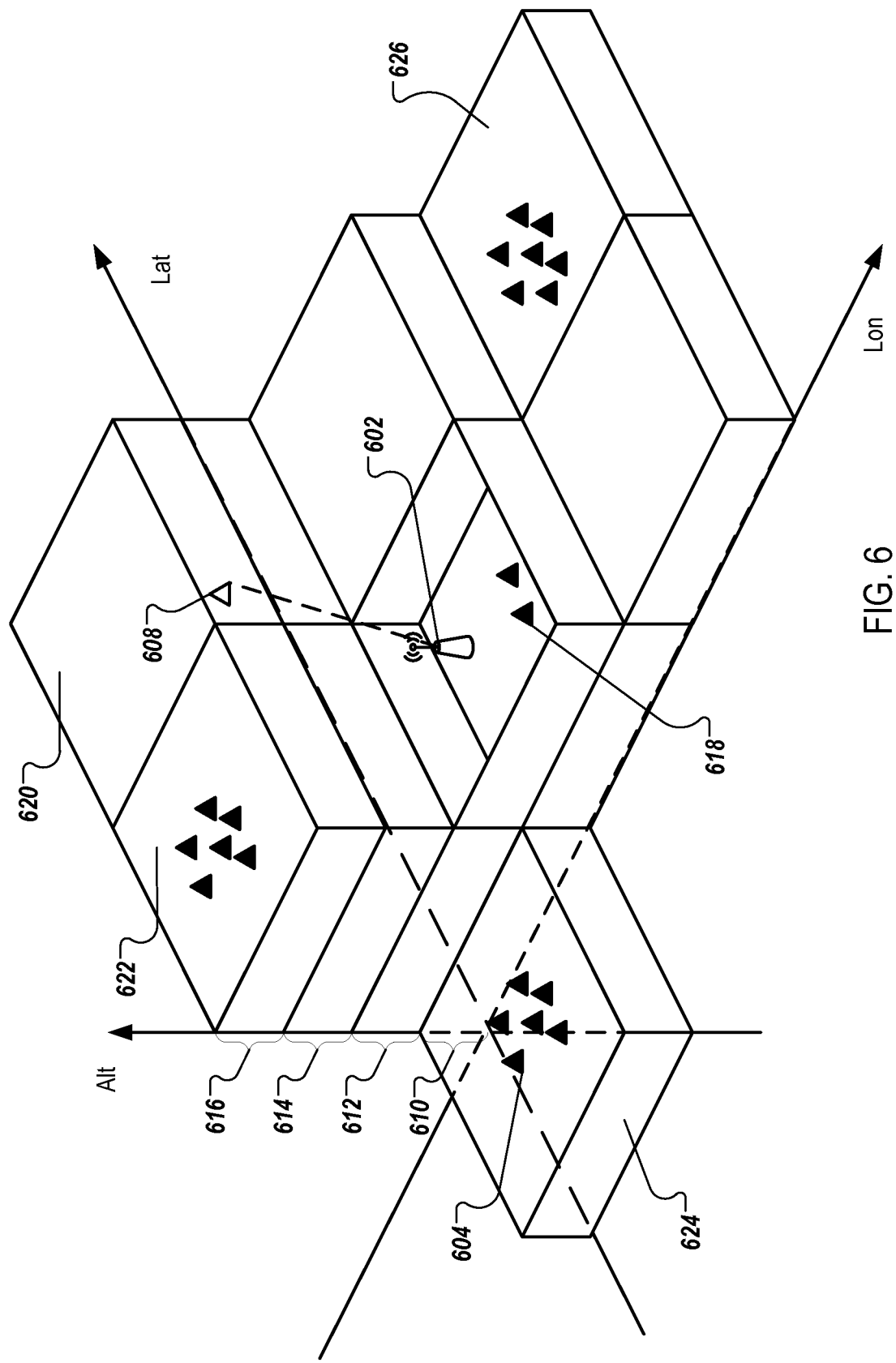
FIG. 6 is a diagram providing an overview of exemplary techniques of location estimation using a probability density function in a three-dimensional space.

FIG. 6 is a diagram providing an overview of exemplary techniques of location estimation using a probability density function in a three-dimensional space. A system can determine an effective altitude of wireless access gateway 602 using location data harvested from one or more mobile devices 604. The effective altitude of wireless access gateway 602 is a calculated altitude of wireless access gateway 602 that can be used to calculate an altitude of mobile device 608 that is located within communication range of wireless access gateway 602. The effective altitude can indicate a likely altitude where mobile device 608 is located. The effective altitude can be, but often is not, an actual altitude of wireless access gateway 602.

The system can create virtual layers 610, 612, 614, and 616. Each virtual layer can correspond to an altitude segment along a Z (altitude) axis in a three-dimensional space. Each altitude segment can have a specified height (e.g., 10 meters). The system can generate a histogram representing a distribution of the locations in the harvested data based on virtual layers 610, 612, 614, and 616. The system can select one or more layers (e.g., layers 610 and 616) based on a probability density function. The probability density function can include a sufficient statistic of the received set of location coordinates for calculating an effective altitude of wireless access gateway 602.

The system can exclude one or more layers (e.g., layer 612) that include one or more outliers. The system can identify outlier 618 by identifying an altitude that is statistically distant from other altitudes in the harvested data.

The system can determine an effective altitude of wireless access gateway 602 based on sets of altitudes in the selected layers 610 and 616. The system can send the effective altitude and effective altitudes of other wireless access gateways to mobile device 608 for determining an altitude of mobile device 608.

In some implementations, the system can determine an effective location of wireless access gateway 602 in a three-dimensional space by using latitude, longitude, and altitude data. The system can create multiple blocks in the three-dimensional space. One of these blocks is exemplary block 620. Block 620 can be defined using one or more sets of latitude, longitude, and altitude coordinates that indicate a length, width, and height. The system can generate a histogram representing a distribution of three-dimensional locations in the harvested data based on the blocks. The system can calculate a probability distribution of harvest data points for each block. The system can select one or more blocks (e.g., blocks 622, 624, and 626) based on a probability density function. The probability density function can include a sufficient statistic of the received set of location coordinates for calculating an effective location of wireless access gateway 602 in the three-dimensional space. The system can calculate the effective location of wireless access gateway 602 in the three-dimensional space by using operations of selection and exclusion in a similar manner as described above with respect to the two-dimensional and altitude calculations.

Probability Density Function Used in Location Estimation

Figure 7A:
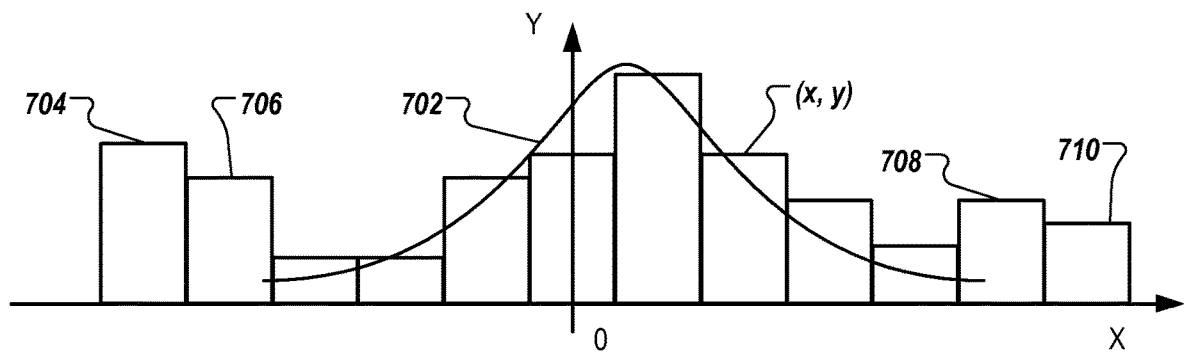
FIGS. 7A and 7B are illustrations of exemplary operations of applying a probability density function to exclude outliers in harvested data.
Figure 7B:
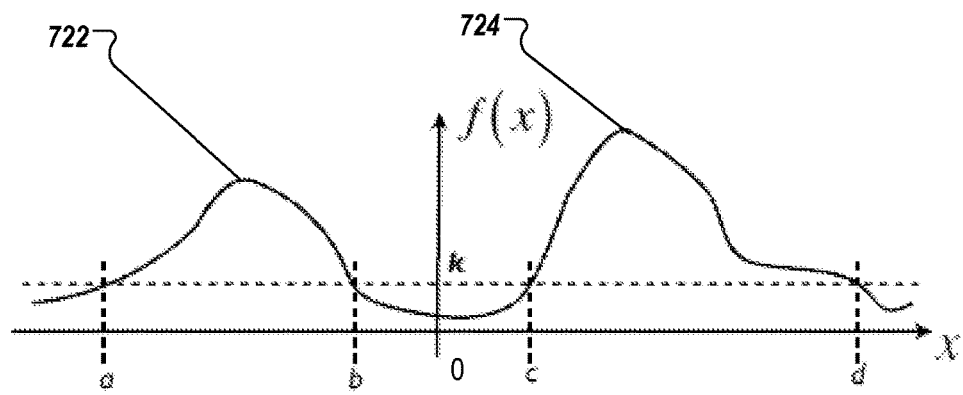

FIGS. 7A and 7B are illustrations exemplary operations of applying a probability function to exclude outliers in harvested data. FIG. 7A illustrates a conventional way of determining an effective location of a wireless access gateway physically located at location "0." The conventional way of determining the location can include, for example, determining the location based on signal strength and triangulation. The X-axis in FIG. 7A can correspond to distance from the location. The Y-axis in FIG. 7A can correspond to a number of data sampled from various mobile devices. A point (x, y) in FIG. 7A can indicate that based on data from y mobile devices, the location of the wireless access gateway is approximately x units from the y mobile devices.

The system utilizing the conventional technologies can determine a unimodal probability distribution 702 for calculating a location of the wireless access gateway. If the actual data distribution is not unimodal, the conventional system can produce suboptimal calculations. For example, information on data 704, 706, 708, and 710 indicating concentration far away from the average can be lost in the calculations.

FIG. 7B is a diagram illustrating calculations performed in estimating a location using a probability density function in one dimension. The X-axis in FIG. 7B can correspond to distance from the location of a. The Y axis in FIG. 7B can correspond to a probability distribution f(x) indicating the probability that a location coordinate in harvested data is at distance x to the location. The probability distribution f(x) can have the following property:

$$\int_{-\infty}^{\infty} f(x)dx = 1 \qquad (1)$$

The probability distribution can be multi-modal. For example, f(x) can have local maxima 722 and 724, which will be referred to as modes of f(x).

The system can determine a measurement for selecting one or more regions (e.g., regions [a, b] and [c, d]) such that an expected value in the selected region satisfies an outlier threshold. For example, the system can determine the measurement k using the following formula:

$$\int_a^b p(x)dx + \int_c^d p(x)dx = 1 - \text{Outlier Threshold} \qquad (2)$$

where $$a,b,c,d = f^{-1}(k) \qquad (3)$$

In (2) and (3), a, b, c, d can define regions. P(x) can indicate a likelihood, according to harvested data, that a location coordinate is located at distance x from an effective location. The Outlier Threshold is a threshold value below which a location coordinate in harvest data is regarded an improbable measurement and not representative of the harvested data. In some implementations, the system can solve k using Newton's Method. In some implementations, the system can sort harvested data and perform the integration until the Outlier Threshold is satisfied.

The calculations are shown in a one-dimensional example. In some implementations, the regions and corresponding calculations can correspond to a two-dimensional or three-dimensional space. For example, in some implementations, the regions can correspond to the one-dimensional altitude segments (as described in reference to FIG. 6), two-dimensional tiles (as described in reference to FIG. 5), or three-dimensional blocks (as described in reference to FIG. 6). Accordingly, calculations can be multi-variable calculations. Each altitude segment, tile, and block can be associated with a bin.

In a two-dimensional space, the system can determine a k-th moment of the probability distribution based on the following formulae:

$$E[X^k] = \int_{-\infty}^{\infty} \int_{-\infty}^{\infty} x^k f(x,y) dy dx$$

$$E[Y^k] = \int_{-\infty}^{\infty} \int_{-\infty}^{\infty} y^k f(x,y) dx dy \qquad (4)$$

The system can determine expected effective location based on the following formulae:

$$E[X] = \int_{-\infty}^{\infty} \int_{-\infty}^{\infty} x f(x,y) dy dx$$

$$E[Y] = \int_{-\infty}^{\infty} \int_{-\infty}^{\infty} y f(x,y) dx dy \qquad (5)$$

Accordingly, the system can determine the standard deviation of the effective location using the following formulae:

$$E[X^2] - E[X]^2 = \sqrt{\int_{-\infty}^{\infty}\int_{-\infty}^{\infty} x^2 f(x,y)dydx - (\int_{-\infty}^{\infty}\int_{-\infty}^{\infty} x f(x,y)dydx)^2} \qquad (6)$$

$$E[Y^2] - E[Y]^2 = \sqrt{\int_{-\infty}^{\infty}\int_{-\infty}^{\infty} y^2 f(x,y)dxdy - (\int_{-\infty}^{\infty}\int_{-\infty}^{\infty} y^2(x,y)dxdy)^2}$$

Figure 8A:
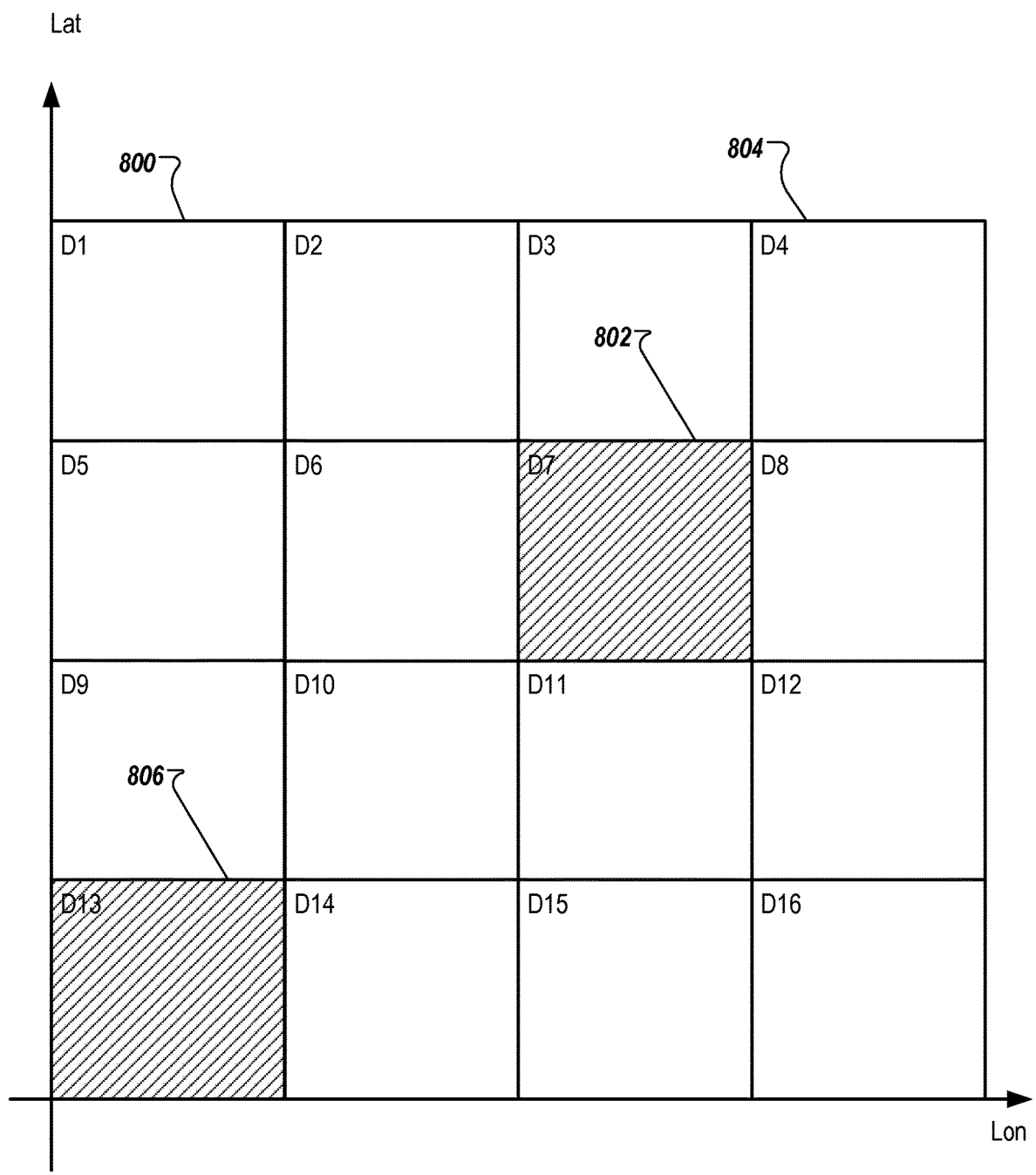
FIG. 8A is a top plan view of an exemplary three-dimensional histogram plot used in location estimation.

FIG. 8A is a top plan view of an exemplary three-dimensional histogram plot 800 used in location estimation (hereafter referred to as "histogram 800"). Histogram 800 is implemented in a two-dimensional space defined by latitude and a longitude. Other dimensions can be implemented similar manner. Histogram 800 can be associated with a wireless access gateway.

Histogram 800 can be defined using a minimum latitude, minimum longitude, maximum latitude, and maximum longitude. Size of histogram 800 can be determined based on technology used by the wireless access gateway. For example, a histogram corresponding to a cell tower can be larger than one that corresponds to a wireless access point in terms of differences between the latitudes and between the longitudes. The size of memory used in storing a larger histogram and the size of memory used in storing a smaller histogram can be the same.

Histogram 800 can correspond to a data structure that includes components as listed in Table 1 below.

TABLE 1

Histogram Data Structure

| DATA | DESCRIPTION |
|---|---|
| Device ID | An identifier of the wireless access gateway |
| Dimension | Latitude/longitude coordinates |
| Width/height | Counts of number of bins in longitude/latitude dimensions respectively |
| Minimum/maximum TOM | Minimum and maximum time of movement. Will be described in further detail below in reference to FIG. 9 |
| Number of data points | Number of harvested data points in the histogram |
| Bins | A list or array of bins in the histogram |
| Minimum/maximum coordinates | Minimum and maximum latitude, longitude, and altitude |

Histogram 800 can include multiple bins (e.g., bins 802, 804, and 806). Some of the bins (e.g., bins 802 and 806, as represented by shaded boxes in FIG. 8) can be bins selected according to the operations as described above in reference to FIG. 7B. Each of the bins can be associated with a count of data point (e.g., values D1 through D16 as shown in FIG. 8A). Each of the bins can correspond to a data structure that includes components as listed in Table 2 below.

TABLE 2

Bin Data Structure

| DATA | DESCRIPTION |
|---|---|
| Dimension | Latitude/longitude coordinates |
| Data points | A count of number of data points in the bin |
| Signal Quality | Minimum/maximum/average value of various |

TABLE 2-continued

Bin Data Structure

| DATA | DESCRIPTION |
|---|---|
|  | measurements of signal quality of the data points (e.g., RSSI, round trip time, or bit error rate) |
| Minimum/maximum TOM | Minimum and maximum time of movement. Will be described in further detail below in reference to FIG. 9 |

The system can extract one or more wireless access gateway identifiers from harvested data, generate histogram 800 by creating the data structures for histogram 800 and the bins in histogram 800. The system can populate the data structures using the harvested data, and perform calculations based on the populated data structures. The data structures do not depend on the number of data points harvested. Accordingly, subsequent calculations using the a probability density function need not increase in complexity and processing time when more data points are harvested.

Figure 8B:
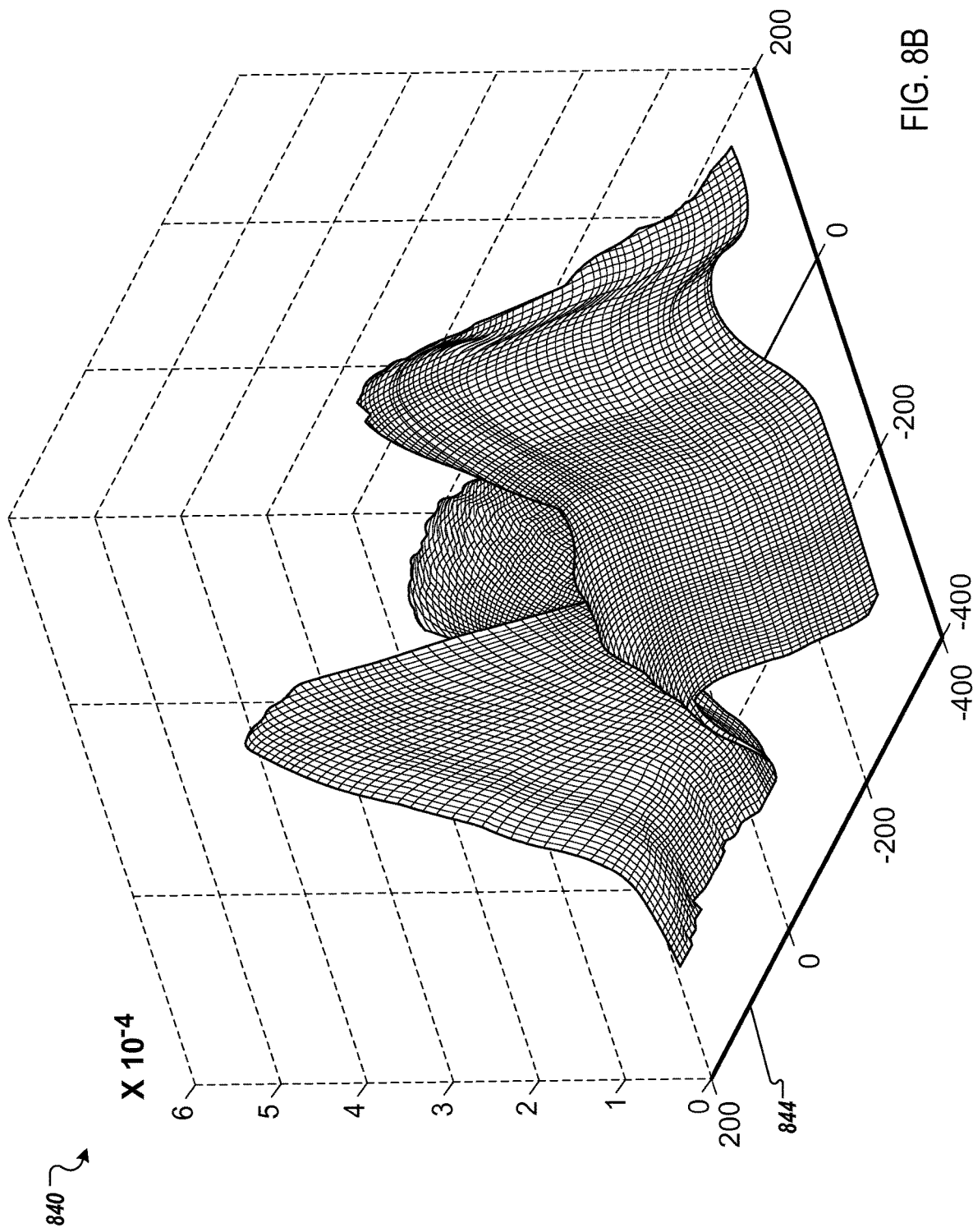
FIG. 8B is an exemplary histogram used in location estimation.

FIG. 8B is an exemplary histogram 840 used in location estimation. Histogram 840 can correspond to a sufficient statistic of harvested data for calculating an effective location based on harvested data points. The sufficient statistic is shown in reference to grid 844. Histogram 840 can be determined using one or more computers.

Filtering Harvested Data

Figure 9:
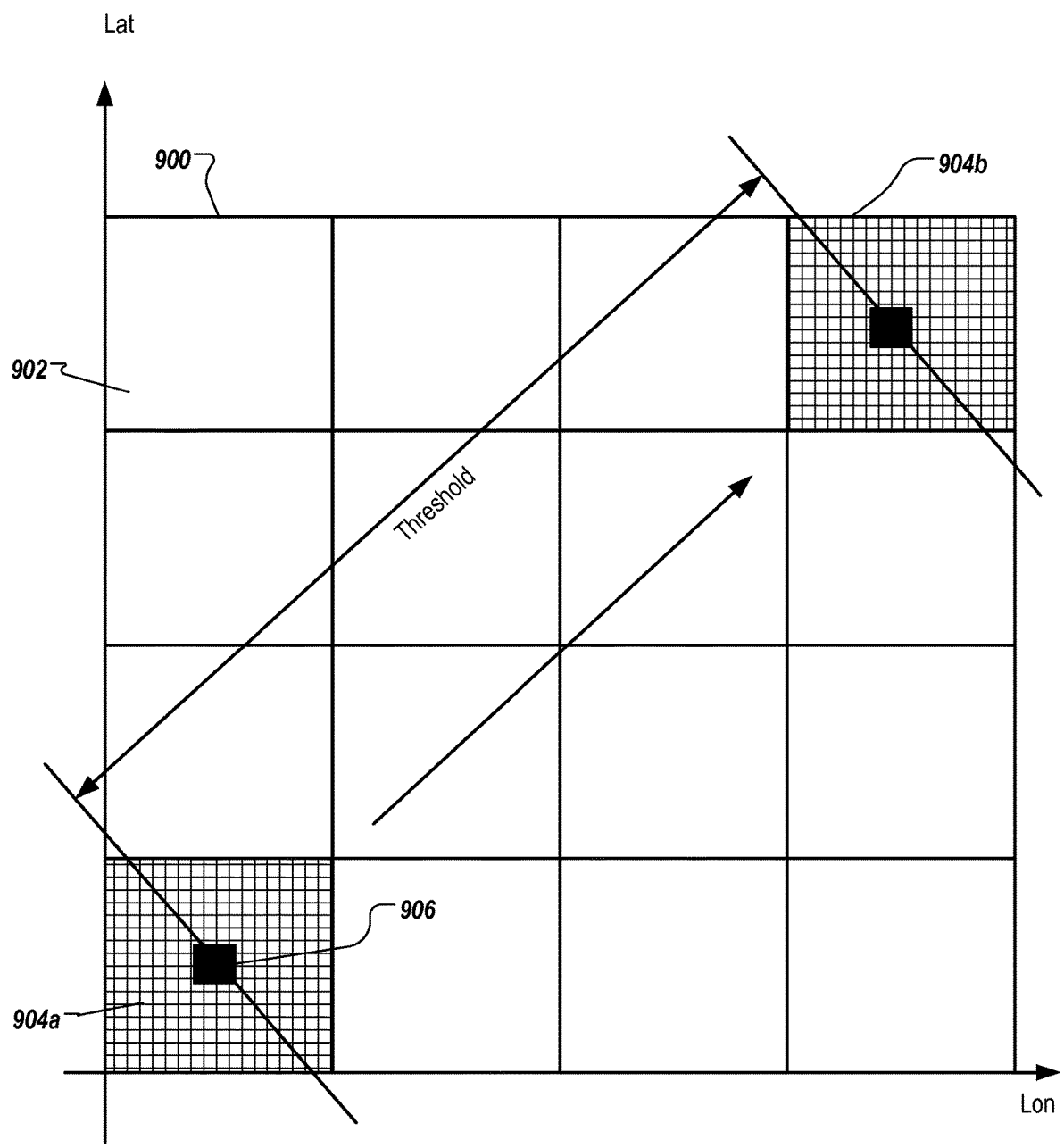
FIG. 9 is a diagram illustrating exemplary techniques of detecting moving wireless access gateways.

FIG. 9 is a diagram illustrating exemplary techniques of detecting moving wireless access gateways. A wireless access gateway can physically move. For example, a wireless access point can be taken from home to work in the morning and from work to home in the evening. A cell tower can change a corresponding cell identifier to one that originally corresponds to another cell tower a long distance away. Identifying moving wireless access gateways can reduce errors in location calculation.

A system can identify movement of a wireless access gateway based on a distance comparison. Map 900 can include multiple grids 902 that correspond to various wireless access gateways. Each grid can correspond to a wireless access gateway, and include multiple bins. Grid 904a can correspond to wireless access gateway 906. Grid 904a can have a data structure that includes minimum and maximum latitudes, longitudes, and altitudes. The system can determine that wireless access gateway 906 has moved when a distance span between two corresponding values in the grid satisfies a threshold. In some implementations, the system can determine a movement based on altitude when the following condition is satisfied:

$$\text{MaxAlt} - \text{MinAlt} > \text{AltThreshold} \quad (7)$$

where MaxAlt is a maximum altitude in harvested data in a grid, MinAlt is a minimum altitude in the harvested data in the grid, and AltThreshold is a specified threshold in altitude.

In some implementations, the system can determine a movement based on latitudes and longitudes when the following condition is satisfied:

$$a(\text{MaxLat}-\text{MinLat})^2 + b(\text{MaxLon}-\text{MinLon})^2 > \text{LatLonThrshold}^2 \quad (8)$$

where MaxLat is a maximum altitude in harvested data in a grid, MinLat is a minimum latitude in the harvested data in the grid, MaxLon is a maximum longitude in harvested data in a grid, MinLon is a minimum longitude in the harvested data in the grid, and AltThreshold is a specified threshold distance. The values a and b can be weights in the latitudes and longitudes. The default values of a and b can be 1. The values of a and b can differ as the latitude goes higher. For example, in high latitude areas, the difference between MaxLon and MinLon can have less weight than that of the difference between MaxLat and MinLat.

In some implementations, the system can determine a movement based on latitudes, longitudes, and altitudes when the following condition is satisfied:

$$a(\text{MaxLat}-\text{MinLat})^2 + b(\text{MaxLon}-\text{MinLon})^2 + c(\text{MaxAlt}-\text{MinAlt})^2 > \text{LatLonAltThreshold}^2 \quad (9)$$

where MaxAlt is a maximum altitude in harvested data in a grid, MinAlt is a minimum altitude in the harvested data in the grid, AltThreshold is a specified threshold in altitude, MaxLat is a maximum altitude in harvested data in a grid, MinLat is a minimum latitude in the harvested data in the grid, MaxLon is a maximum longitude in harvested data in a grid, MinLon is a minimum longitude in the harvested data in the grid, and AltThreshold is a specified threshold distance. The values a, b, and c can be weights in the latitudes, longitudes, and altitudes.

When the system determines that a wireless access gateway has moved the system can select data points from the harvested data based on age distinctions. The system can determine a time after which a condition (7), (8), or (9) is satisfied and designate the determined time as a time of movement (TOM). The system can select data points having timestamps after the last TOM for location calculation, and ignore data points having timestamps before the last TOM. For example, before the time of movement, the data points for wireless access gateway 906 can correspond to grid 904a. After the time of movement, the data points for wireless access gateway 906 can correspond to grid 904b.

The system can determine whether wireless access gateway 906 was moving when data of wireless access gateway 906 were harvested. Wireless access gateway 906, if was moving (e.g., in a car driving by a mobile device gathering data) and was harvested by accident, can cause location estimation errors. Accordingly, the system can exclude wireless access gateway 906 from location calculations if wireless access gateway 906 is a moving gateway.

The system can determine movement of wireless access gateway 906 by storing a minimum time of movement and a maximum time of movement. The system can use the minimum time between movements and a maximum time of movement to filter out wireless access gateway 906. If the minimum time between the minimum time of movements and the maximum time of movement of wireless access gateway 906 satisfies a threshold (e.g., less than a threshold), the system can designate wireless access gateway 906 as a low value wireless access gateway, and excludes wireless access gateway 906 from location estimation.

Figure 10:
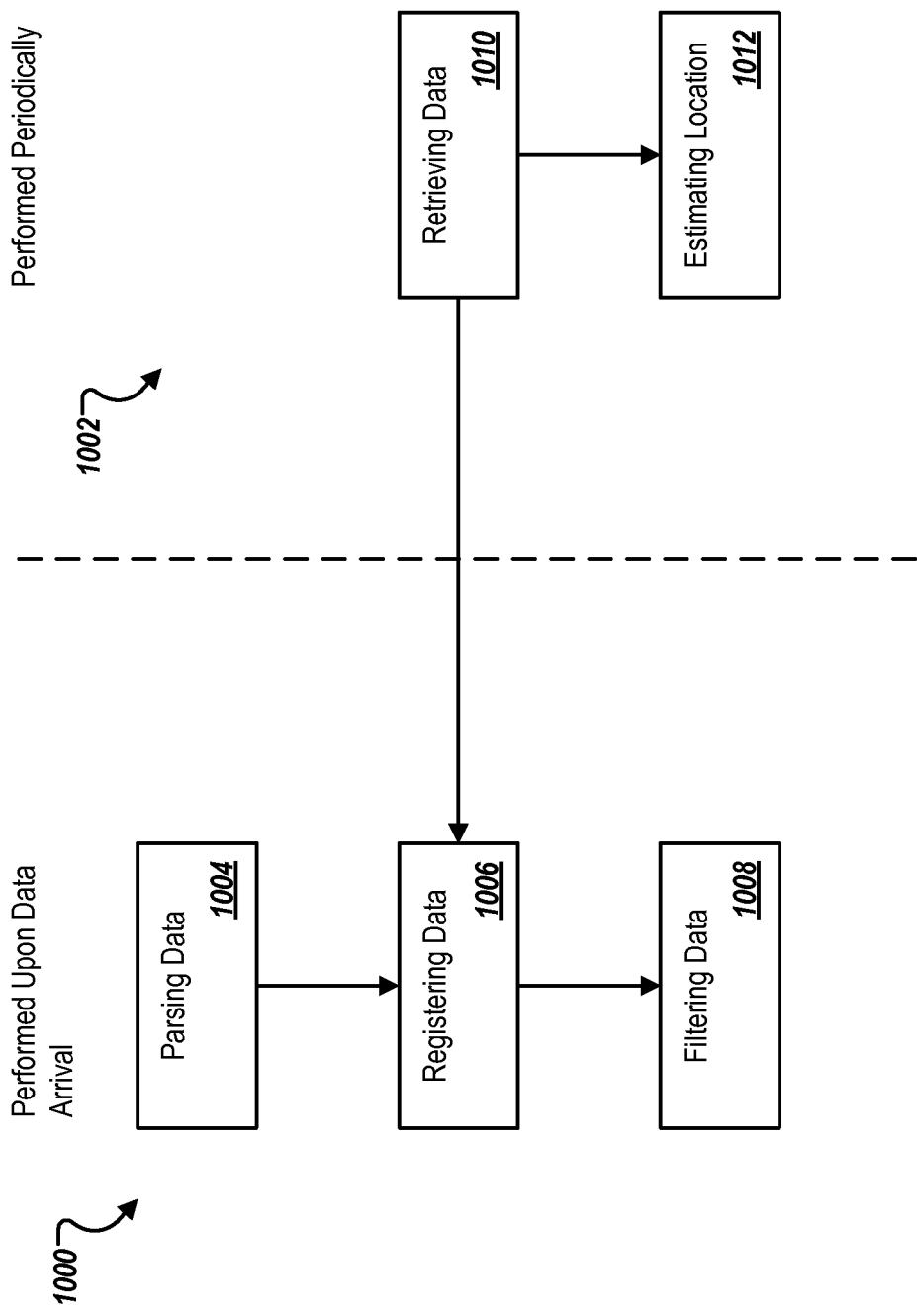
FIG. 10 is a flowchart illustrating exemplary operations of data harvesting and location estimation.

FIG. 10 is flowchart illustrating exemplary operations of data harvesting and location estimation. The operations can include data harvesting operations 1000 and location estimation operations 1002. Data harvesting operations 1000 can be performed continuously, for example, as a daemon. Data harvesting operations 1000 can be performed upon data arrival. A system can parse (1004) the data when the data arrive. Parsing the data can include identifying data fields for latitude, longitude, altitude, timestamp, wireless access gateway identifier, RSSI, or other information.

The system can register (1006) the parsed data as harvested data. Registering the parsed data can include storing at least a portion of the parsed data in a data store. Registering the parsed data can include excluding some of the parsed data when the parsed data includes invalid information (e.g., an invalid wireless access gateway identifier).

The system can filter (1008) the harvested data. Filtering the harvested data can include identifying stale data that the system will no longer use to estimate a location and discarding the identified stale data. The stale data can include location data corresponding to a wireless access gateway that has moved.

The system can perform location estimation operations 1002 under a scheme that is independent from the data harvesting operations 1000. For example, the system can perform location estimation operations 1002 periodically (e.g., every two weeks) or upon request. The system can retrieve (1010) the harvested data. The operations of retrieving harvested data can include interacting with operations of registering the data (operations 1006). The system can estimate (1012) a location of a wireless access gateway using retrieved data.

Exemplary System Components

Figure 11:
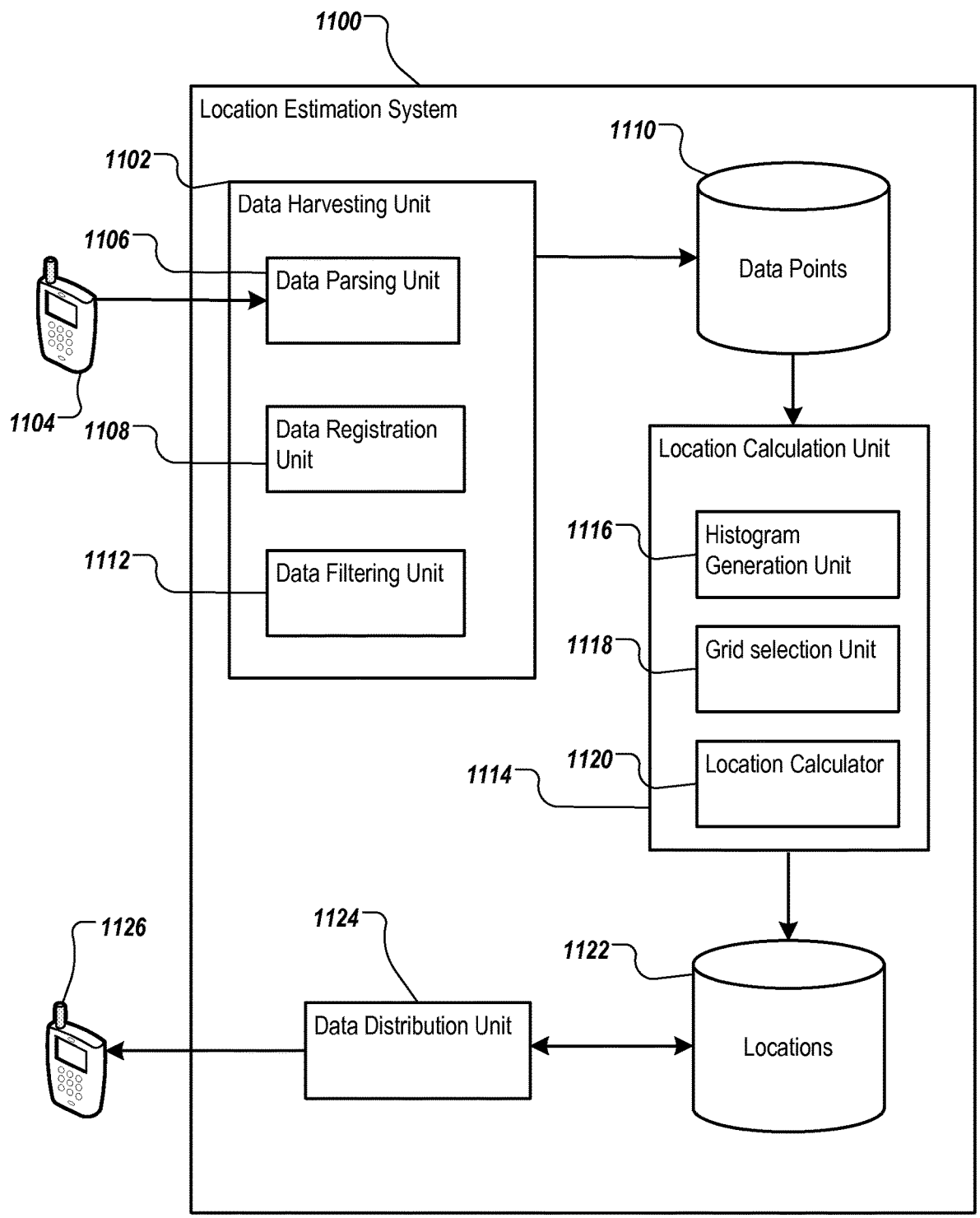
FIG. 11 is a block diagram illustrating various units of an exemplary system configured to perform location estimation using a probability density function.

FIG. 11 is a block diagram illustrating various units of an exemplary system configured to perform location estimation using a probability density function. Location estimation system 1100 can include data harvesting unit 1102. Data harvesting unit 1102 is a component of location estimation system 1100 that is programmed to receive and process data from one or more mobile devices 1104. Data harvesting unit 1102 can include data parsing unit 1106. Data parsing unit 1106 is a component of data harvesting unit 1102 that is configured to receive the raw data from the one or more mobile devices 1104, parse the data fields of the raw data, and generate structured data (e.g., name/value pairs). Further details of operations of data parsing unit 1106 are described above in reference to stage 1004 of FIG. 10.

Data harvesting unit 1102 can include data registration unit 1108. Data registration unit 1108 is a component of data harvesting unit 1102 that is configured to receive parsed data (e.g., name/value pairs) generated by data parsing unit 1106, and send at least a portion of the parsed data to data point data store 1110 for storage. Further details of operations of registration unit 1108 are described above in reference to stage 1006 of FIG. 10. Data point data store 1110 can include a database (e.g., a relational database, an object-oriented database, or a flat file) that is configured to store location information in association with wireless access gateway identifiers.

Data harvesting unit 1102 can include data filtering unit 1112. Data filtering unit 1112 is a component of data harvesting unit 1102 that is configured to identify stale data from data point data store 1110, and remove the stale data from data point data store 1110. Further details of operations of filtering unit 1112 are described above in reference to stage 1008 of FIG. 10.

Location estimation system 1100 can include location calculation unit 1114. Location calculation unit 1114 is a component of location estimation system 1100 that is configured to generate one or more estimated locations based on data points stored in data point data store 1110 using a probability density function. Location calculation unit 1114 can include histogram generation unit 1116. Histogram generation unit 1116 is a component of location calculation unit 1114 that is configured to generate a histogram (e.g., histogram 800 as described in reference to FIG. 8A) based on data points from data point data store 1110. Histogram generation unit 1116 can generate a histogram for each wireless access gateway.

Location calculation unit 1114 can include grid selection unit 1118. Grid selection unit 1118 is a component of location calculation unit 1114 that is configured to select one or more bins from the histogram generated by histogram generation unit 1116 using a probability density function. The selection operations can include applying the probability function as described above in reference to FIG. 7B.

Location calculation unit 1114 can include location calculator 1120. Location calculator 1120 is a component of location calculation unit 1114 that is configured to calculate a location of each wireless access gateway based on the selected bins, and to calculate an uncertainty of the calculated location. The calculated location can include location coordinates including latitude, longitude, and altitude. The uncertainty can indicate an estimated accuracy of the calculated location.

Location calculator 1120 can be configured to calculate a reach of each wireless access from information associated with data points stored in data point data store 1110. The reach of a wireless access gateway can indicate a maximum distance from which the wireless access gateway can be expected to be observed by a mobile device. Location calculator 1120 can calculate the reach using locations in the harvested data and the calculated location.

Location calculation unit 1114 can generate output including the location coordinates determined by location calculator 1120. The location coordinates can be associated with an identifier of the wireless access gateway, an uncertainty, and a reach of the wireless access gateway. Location estimation system 1100 can store the output in a location data store 1122. Location data store 1122 can be a database configured to store the location coordinates and associated information.

Location estimation system 1100 can include data distribution unit 1124. Data distribution 1124 is a component of location estimation system 1100 that is configured to retrieve the location coordinates and associated information stored in location data store 1122 and send the location coordinates and associated information to one or more mobile devices 1126. Mobile devices 1126 can be the same mobile devices as mobile device 1104, or separate and different mobile devices.

Operations of Location Estimation

Figure 12A:
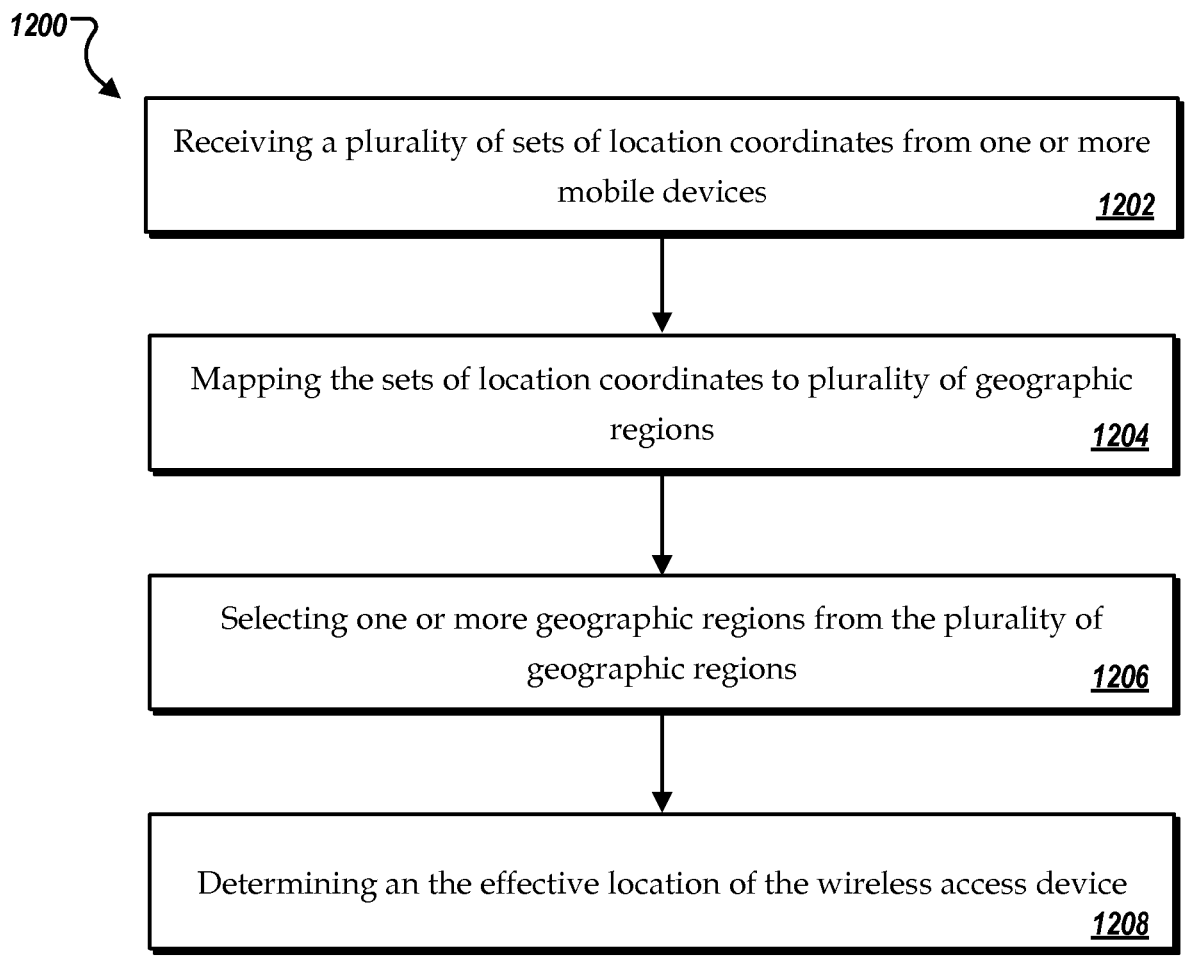
FIGS. 12A-12C are flowcharts illustrating exemplary operations of location estimation using a probability density function.
Figure 12B:
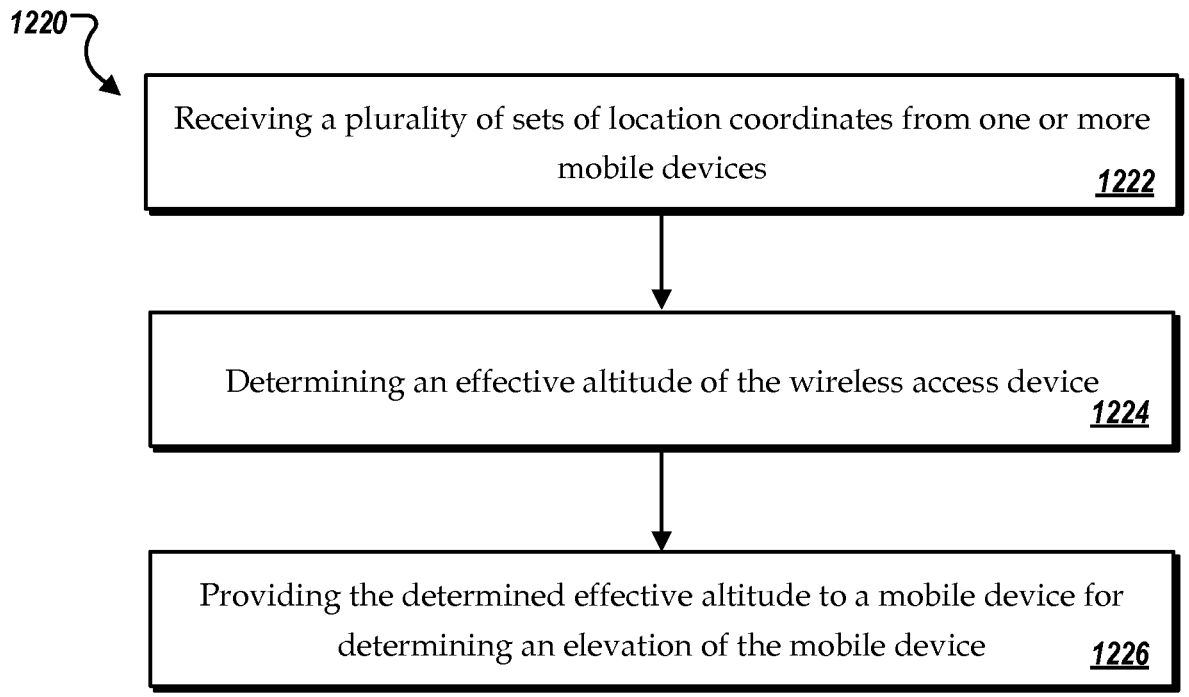
Figure 12C:
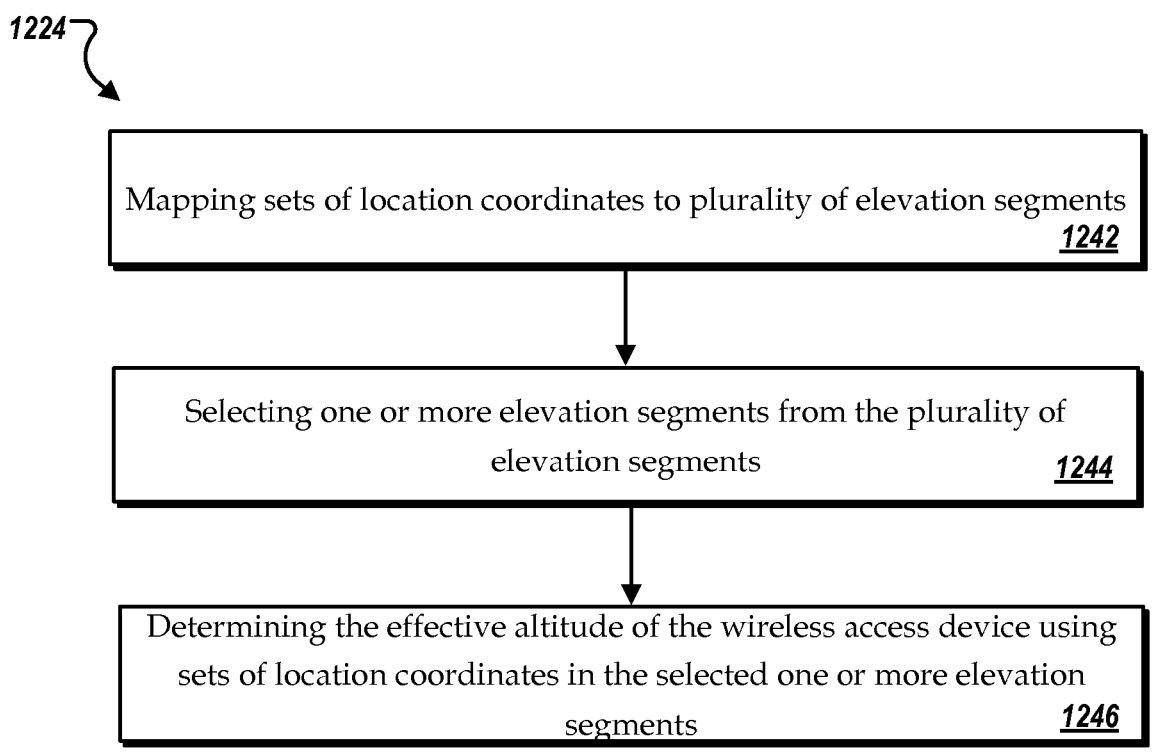

FIGS. 12A-12C are flowcharts illustrating exemplary operations 1200 of location estimation using a probability density function. FIG. 12A is a flowchart illustrating exemplary operations of location estimation using a sufficient statistic of harvested data for calculating an effective location. Operations 1200 of FIG. 12A can be performed by a system including hardware and software components (e.g., location estimation system 1100 as described above in reference to FIG. 11).

The system can receive (1202) multiple sets of location coordinates from one or more mobile devices. Each set of location coordinates can be associated with a wireless access gateway. Each set of location coordinates can include latitude, longitude, and altitude. The altitude can be measured in meters or feet from sea level. The wireless access gateway can include a wireless device operable to connect a mobile device to at least one of a personal area network, a local area network, a metropolitan area network, a wide area network, or a cellular network. For example, the wireless access gateway can include a WAP, a cell tower, or a Bluetooth™ device.

The system can map (1204) the sets of location coordinates to multiple geographic regions. In some implementations, each geographic region can be a bin of a geographic grid comprising multiple bins. The geographic grid can be a geographic area associated with the wireless access gateway.

The system can select (1206) one or more geographic regions from the multiple geographic regions. The selection can be based on a density of received location coordinates in each of the geographic regions. Selecting the one or more geographic regions can be based on a specified outlier threshold for identifying and excluding one or more outliers in the sets of location coordinates.

The system can perform the selection operations using a probability density function. The probability density function can include a sufficient statistic of the received set of location coordinates for calculating an effective location of the wireless access gateway. Selecting the one or more geographic regions can include, determining, for each geographic region and using the probability density function, an expected value based on a relative probability that a received set of location coordinates is located within the geographic region. The system can select the one or more geographic regions when a measurement of the expected value corresponding to the one or more geographic regions satisfies the outlier threshold. The measurement can be a sum or weighted sum. The system can determine that the measurement satisfies the outlier threshold when a sum or weighted sum of the corresponding expected values equals one minus the outlier threshold. Further details on operations of determining that the measurement satisfies the outlier threshold are described above in reference to FIG. 7B.

In some implementations, each set of the location coordinates is associated with a weight, the weight indicating a degree of certainty of the set of location coordinates. The expected value can be determined based on the relative probability and the weight. The system can determine the weight based on at least one of a received signal strength indication (RSSI) or a bit error rate associated with each data point. Applying the weights, the system can determine a k-th moment of the probability distribution based on the following formula:

In some implementations, the system can select one or more sets of location coordinates from the selected one or more geographic regions based on an estimated movement of the wireless access gateway. Determining the effective location of the wireless access gateway can include determining the effective location of the wireless access gateway using the selected sets of location coordinates. Selecting the one or more sets of location coordinates from the selected one or more geographic regions can include determining that at least one set of location coordinates is obsolete when a variation of sets of location coordinates exceeds a threshold. The variation of sets of location coordinates can exceed the threshold when the wireless access gateway has moved. The system can select the one or more sets of location coordinates by excluding the obsolete set of location coordinates.

To determine the variation, the system can utilize timestamps. Each set of location coordinates can have a timestamp corresponding to a time of measurement. Selecting the one or more sets of location coordinates can include excluding a collection of one or more sets of location coordinates in a geographic region when a span of the corresponding time of measurements of the sets in the collection satisfies a threshold time.

The system can determine (1208) the effective location of the wireless access gateway using sets of location coordinates in the selected one or more geographic regions. The effective location can include a reach of the wireless access gateway and an estimated uncertainty of the wireless access gateway. The system can send the effective location to one or more mobile devices. A mobile device located within a communication range of the wireless access gateway can use the effective location to calculate a current location of the mobile device.

FIG. 12B is a flowchart illustrating exemplary operations 1220 of altitude estimation based on statistics analysis. A system for determining an effective altitude of a wireless access gateway can receive (1222) multiple sets of location coordinates from one or more mobile devices. Each set of location coordinates can be associated with a wireless access gateway. Each set of location coordinates can include an altitude.

The system can determine (1224) an effective altitude of the wireless access gateway based on a statistical analysis using the received sets of location coordinates. Further details on determining the effective altitude of the wireless access gateway based on a statistical analysis will be described below in reference to FIG. 12C.

The system can provide (1226) the determined effective altitude to a mobile device for determining an altitude of the mobile device when the mobile device is located within a communication range of the wireless access gateway.

FIG. 12C is a flowchart illustrating exemplary operations 1224 to determine an effective altitude of the wireless access gateway based on a statistical analysis. A system can map (1242) sets of location coordinates to multiple elevation segments.

The system can select (1244) one or more elevation from the multiple elevation segments based on a density of received location coordinates in each of the elevation segments using a probability density function. The probability density function can include a sufficient statistic of the received sets of location coordinates for calculating the effective altitude. Selecting the one or more elevation segments can include determining, for each elevation segment and using the probability density function, an expected value based on a relative probability that a received set of location coordinates is located within the elevation segment. The system can select the one or more elevation segments when a measurement of the expected probability value corresponding to the one or more elevation segments satisfies an outlier threshold. The system can determine that the measurement satisfies the outlier threshold when a sum or weighted sum of the corresponding expected values equals one minus the outlier threshold.

In some implementations, the system can select one or more sets of location coordinates from the selected one or more elevation segments based on an estimated movement of the wireless access gateway. Determining the effective altitude of the wireless access gateway can include determining the effective altitude of the wireless access gateway using the selected sets of location coordinates. Selecting the one or more sets of location coordinates from the selected one or more elevation segments can include determining that at least one set of location coordinates is obsolete when a variation of sets of location coordinates exceeds a threshold. The variation of sets of location coordinates can exceed the threshold when the wireless access gateway has moved. The system can select the one or more sets of location coordinates by excluding the obsolete set of location coordinates.

To determine the variation, the system can utilize timestamps. Each set of location coordinates can have a timestamp corresponding to a time of measurement. Selecting the one or more sets of location coordinates can include excluding a collection of one or more sets of location coordinates in a elevation segment when a span of the corresponding time of measurements of the sets in the collection satisfies a threshold time.

The system can determine (1246) the effective altitude of the wireless access gateway using sets of location coordinates in the selected one or more elevation segments. The system can send the effective altitude of the wireless access gateway to one or more mobile devices for estimating an altitude of the mobile devices.

AP Location Estimation Using Collocated AP Harvest Data

AP harvesting generally requires harvesting devices to have accurate location estimation during harvest, which is often provided by GPS. This requirement prevents the system from estimating the location of APs when accurate location information is unavailable to harvesting client devices. Many APs operate in such environments. These APs are often located in places where GPS is unavailable or inaccurate, such as in dense urban areas or the interior of structures. This requirement for accurate GPS information biases AP location estimates towards locations where GPS is available, leading to inaccurate AP location estimates for APs operating in environments where GPS is unavailable.

To overcome these limitations, collocated wireless information (e.g., WiFi information) can be used to improve AP location estimates. As used herein, a set of APs are "collocated" if they can be detected by a mobile device simultaneously, e.g., a WiFi scan performed by a wireless transceiver of a harvesting mobile device contains a complete set of APs. Using this collocated information as a new source of harvest data, the locations of APS can be estimated for which accurate harvest location information is unavailable. Also, previous AP location estimates can be improved using the collocated information.

In some implementations, harvesting devices (e.g., mobile phones) can generate harvest data, such as time-tagged wireless scan data (e.g., WiFi scan data). The following disclosure describes the use of WiFi scans to generate harvest data. It is noted, however, that other wireless technologies can be used, such as Bluetooth and NFC.

WiFi scans generated by harvesting devices can be tagged with device location estimates (e.g., latitude, longitude, altitude) at harvest time, which is referred to herein as "harvest locations." When the harvest location is uncertain or unavailable (e.g., no GPS available), this uncertainty is included in the harvest data. For example, WiFi scan data can be tagged (e.g., by setting one or more flags) to indicate that the harvest location is not included in the WiFi scan data. As will be described below, this tagged WiFi scan data can be used together with accurately location-tagged WiFi scans to improve the estimates of AP locations of a wireless network.

In some implementations, the harvest data can be sent to one or more servers periodically or in response to one or more trigger events. The location of each AP in the WiFi scans is estimated using the harvest data. Each AP location can be modeled as a multivariate random variable, with estimated uncertainty based on the harvest location of each WiFi scan, weighted according to age and RSSI values, as described in reference to FIGS. 5-12. When the estimated harvest location of a WiFi scan is known or estimated with high certainty (e.g., using GPS data), then this estimated harvest location is processed directly, providing an initial estimate of some of the AP locations detected in the WiFi scan. When the harvest location is uncertain or unknown, the harvest location is treated as a parameter to be optimized. These parameters can be estimated in an iterative manner, first using the initial AP locations derived from WiFi scans with known harvest locations, considering the RSSI and estimated AP location uncertainty for each AP in the WiFi scan. These new parameters now provide new estimated AP locations, while also providing AP location estimates for previously unknown APs (e.g., APs which did not occur in harvest data with accurate, initial WiFi scan location estimates).

In subsequent iterations, adding the APs redefines the optimal estimation of the uncertain harvest location parameters, further modifying AP location estimates and estimating new AP locations. This iterative process finishes when new APs are no longer being learned and/or the estimated AP locations sufficiently converge. The estimated AP locations can be served to client devices, which then use the estimated AP locations to estimate client device locations with their current WiFi scans, as described in reference to FIGS. 1-4.

Exemplary Collocation Process

Definitions

We assume the system is initialized from previous work and processes. A harvest data set H defines where APs have been previously observed. Assume that, at time $t \in R$, an AP with distinct Media Access Control (MAC) address m was harvested at geographic coordinates $p \in G = )(-90°, 90°) \times (-180°, 180°) \times (-\infty, \infty)$ (i.e., a vector corresponding to latitude, longitude and altitude), with a RSSI of r. Then, there exists $h \in H$ such that $h = [m, p, t, r]^T$. In this manner, harvest data set H defines when and where a set of APs have been observed by, for example, a wireless transceiver of a harvesting device. We also define mac(H) as the set of MAC addresses contained in H.

An additional source of information, in the form of a new harvested set of WiFi scans S provides collocated information. Each WiFi scan includes a set of MAC addresses and RSSI values, corresponding to APs that a harvesting device recorded simultaneously (i.e., each AP in the scan was seen roughly at the same time, with the corresponding RSSI values). Also, each new WiFi scan does not have geographic coordinates with it. Assume that, at time t, a harvesting device recorded APs with MAC addresses $m_1$ and $m_2$, with corresponding RSSI values $r_1$ and $r_2$, and harvested this information. This implies that there exists $s \in S$ such that $s = (t, \{[m_1, r_1]^T, [m_2, r_2]^T\})$. This implies that the AP corresponding to MAC address $m_1$ is observable along with the AP corresponding to MAC address $m_2$, implying that they collated. We define t(s) and mac(s) as the time and set of MAC addresses contained in WiFi scan s, respectively. We also define rssi(mac, s) as the RSSI corresponding to MAC address mac in WiFi scan s.

The goal of the above collocation process is to estimate the location of each AP. Therefore, we define A as a set of APs. Assume that there exists an AP with MAC address mac and estimated location $p \in G$. Then, this implies that there exists $a \in A$ such that $a = [mac, p]^T$.

Collocation Process Steps

The collocation process steps can be represented in pseudocode as shown below.

```
Data: Harvest data H and WiFi scans S
Result: Estimated AP locations A
 1   A= estimateAPs(H);
 2   repeat
 3      H' =0;
 4      for s ∈ S do
 5         p=scanLocation(s, A);
 6         for m ∈ mac(s) do
 7            h'=[m, p, t(s), rssi(mac,s)]^T;
 8            H'=H' ∪ h';
 9         end
10      end
11      A= estimateAPs(H ∪ H');
12   until convergence (A);
```

Referring to the collocation steps described above, a set of AP locations A is initialized using initial harvest data H (line 1). The collocation process iterations begin (line 2). Each iteration of the collocation process, creates a new, empty set of harvest data H' (line 3). This new set of harvest data H' is populated by iterating through each WiFi scan s (line 4), assigning a position p to each WiFi scan s, using the AP locations estimated in A as input to function scanLocation(s, A).

The scanLocation( ) function (line 5) is responsible for, given a WiFi scan s and a set of APs A, returning a geographic location p∈G (e.g., latitude, longitude, altitude), which is an estimate of where the scan s took place (the harvest location). The function scanLocation( ) can also be used by client devices to solve for their location using WiFi scans s and served AP locations A, as described in reference to FIGS. 1-4.

After estimating the location p for each WiFi scan s, the collocation process combines additional harvest data h' to harvest data set H'. Each MAC address in WiFi scan s, along with the WiFi scan time t(s) and the corresponding RSSI value rssi(mac, s), are added to the new harvest set H' (line 6).

Once all WiFi scans S have been used to generate new harvest data set H', the AP locations A are estimated again, but, this time, using both the initial harvest set H and the new, augmented harvest data set H' (line 11).

By estimating the AP locations with both H and H', the new AP locations A now contain collocated information. If there exists an AP with MAC address m such that m∉mac(H), along with a WiFi scan s∈S such that m∈mac(s), and a location p is estimated for WiFi scan s (line 5), then the harvest set H' has harvest data for this AP, which was missing in H. This implies that this estimation of APs can yield new AP locations, based on collocated information. It also adjusts previously estimated APs with the new collocated information.

The collocation process iterates until convergence is satisfied (line 12). Convergence criteria are satisfied if the AP locations do not change sufficiently between iterations, i.e., if the number of APs estimated does not change and the difference in estimated AP locations between iterations is small enough to satisfy a threshold value.

The estimatedAPs( ) function in lines 1 and 11 can be implemented according to the description corresponding to FIGS. 5-12 and the scanLocation( ) function in line 5 can be implemented according to the description corresponding to FIGS. 1-4. These processes estimate the AP locations and solve for the locations of client devices by WiFi scan, respectively. Essentially, estimateAPs( ) defines a PDF describing each AP, while scanLocation( ) uses these PDFs to assign a location to WiFi scans.

By using collocated harvest data with accurate location-tagged harvest data, the location of APs that could not be estimated previously can now be estimated. This allows client devices to generate WiFi location estimates where conventional system could not provide one. It allows for more accurate and robust AP location estimates, and, thus, more accurate and robust client device location estimates.

Figure 13:
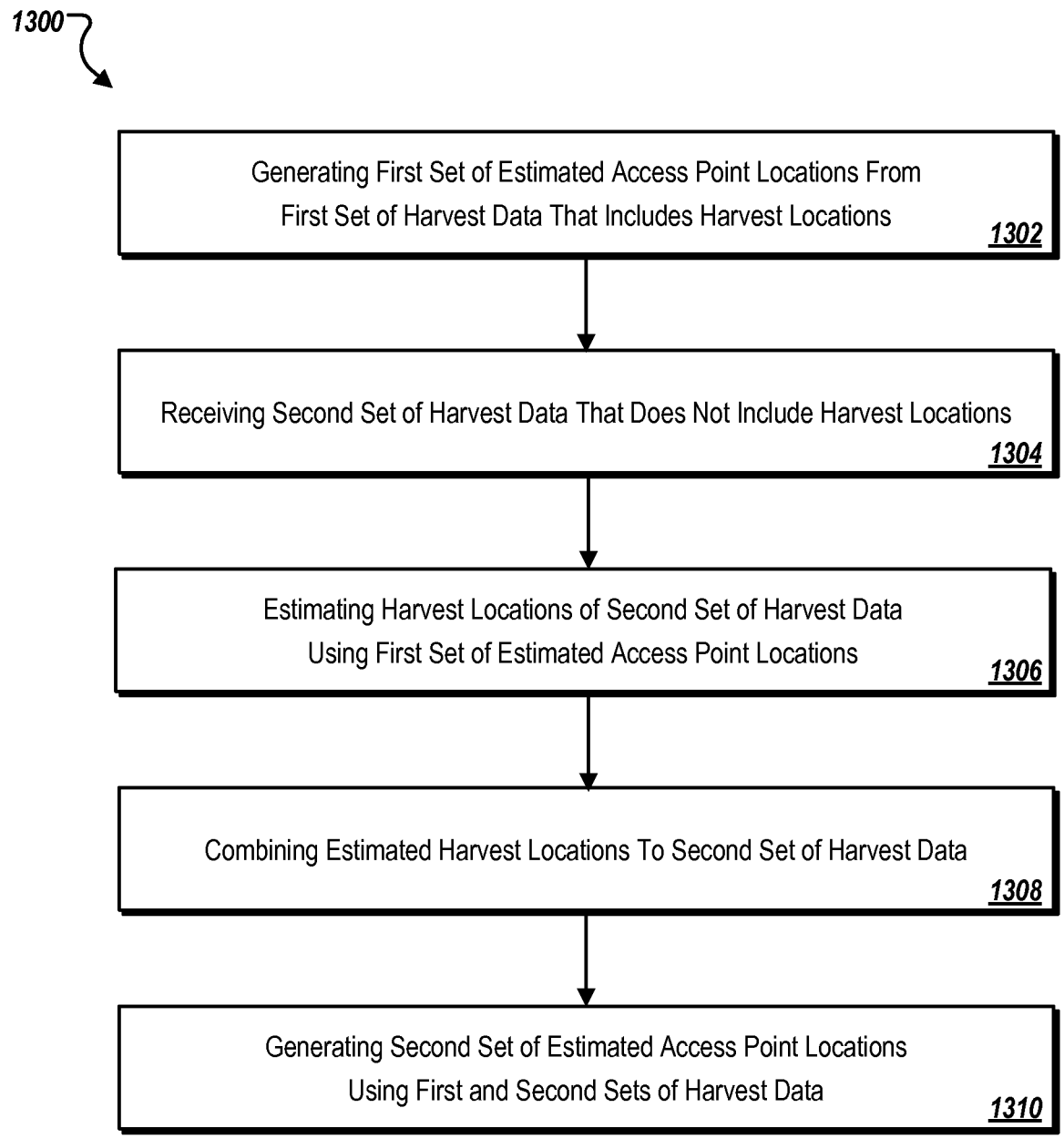
FIG. 13 is a flowchart illustrating exemplary operations of AP location estimation using collocated AP harvest data.

FIG. 13 is a flowchart illustrating exemplary operations of AP location estimation using collocated AP harvest data. Process 1300 can be implemented using the architecture described in reference to FIG. 14.

Process 1300 can begin by generating a first set of estimated access point locations from a first set of harvest data that includes harvest locations (1302). The harvest locations can be determined by an accurate positioning system, such as GPS. For example, each WiFi scan can be augmented with GPS information to identify the location where the scan took place. The first set of estimated access point locations can be generated using, for example, the processes described in reference to FIGS. 5-12.

Process 1300 can continue by receiving a second set of harvest data that does not include harvest locations (1304). For example, the second set of harvest data would include collocated information that does not include GPS information or any other information identifying the location where the scan took place.

Process 1300 can continue by estimating harvest locations of the second set of harvest data using the first set of estimated access point locations (1306). For example, for each WiFi scan, the location of the scan can be estimated using the first set of estimated access points in a multi-pass, iterative process, such as the process described in reference to FIGS. 1-4.

Process 1300 can continue by combining the estimated harvest locations to the second set of harvest data (1308). The first set of harvest data that includes accurate location-tagged WiFi scan data is added to the second set of harvest data that includes the harvest locations estimated in step 1306.

Process 1300 can continue by generating a second set of estimated access point locations using the first and second sets of harvest data (1310). The combined harvest data sets an be input into an AP location process, such as the processes described in reference to FIGS. 5-12, to discover new, previously unknown AP locations and to improve the accuracy of known AP locations.

Exemplary System Architecture

Figure 14:
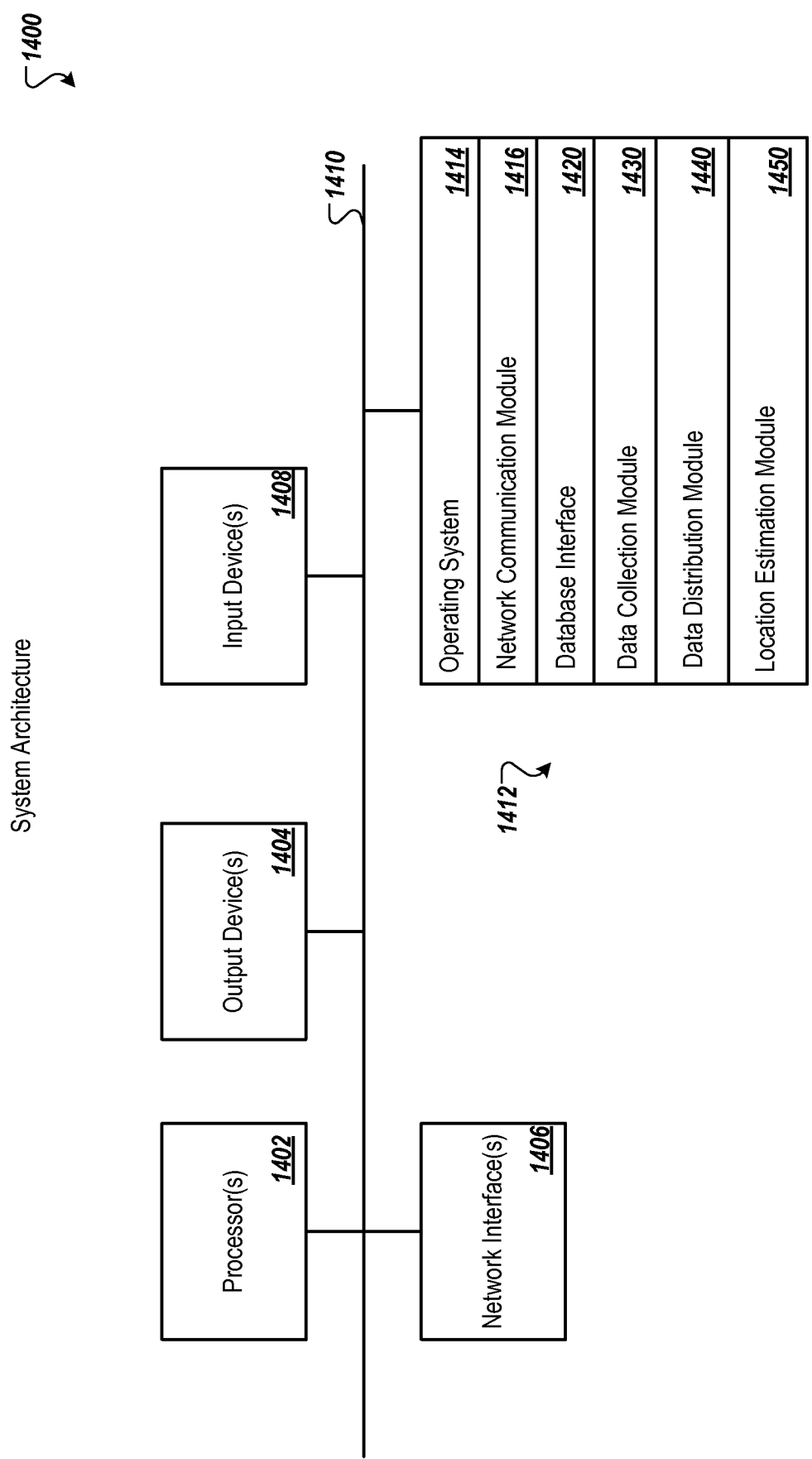
FIG. 14 is a block diagram of exemplary system architecture for implementing the features and operations described in reference to FIGS. 1-13.

FIG. 14 is a block diagram of exemplary system architecture 1400 for implementing the features and operations described in reference to FIGS. 1-5. Other architectures are possible, including architectures with more or fewer components. In some implementations, architecture 1400 includes one or more processors 1402 (e.g., dual-core Intel® Xeon® Processors), one or more output devices 1404 (e.g., LCD), one or more network interfaces 1406, one or more input devices 1408 (e.g., mouse, keyboard, touch-sensitive display) and one or more computer-readable mediums 1412 (e.g., RAM, ROM, SDRAM, hard disk, optical disk, flash memory, etc.). These components can exchange communications and data over one or more communication channels 1410 (e.g., buses), which can utilize various hardware and software for facilitating the transfer of data and control signals between components.

The term "computer-readable medium" refers to any medium that participates in providing instructions to processor 1402 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1412 can further include operating system 1414 (e.g., Mac OS® server, Windows® NT server), network communication module 1416, database interface 1420, data collection module 1430, data distribution module 1440, and location calculation module 1450, as described in reference to FIGS. 1-4. Operating system 1414 can be multi-user, multiprocessing, multitasking, multi-threading, real time, etc. Operating system 1414 performs basic tasks, including but not limited to: recognizing input from and providing output to devices 1406, 1408; keeping track and managing files and directories on computer-readable mediums 1412 (e.g., memory or a storage device); controlling peripheral devices; and managing traffic on the one or more communication channels 1410. Network communications module 1416 includes various components for establishing and maintaining network connections (e.g., software for implementing communication protocols, such as TCP/IP, HTTP, etc.). Database interface 1420 can include interfaces to one or more databases (e.g., data point database 360 and location database 372 of FIG. 3) on a file system. The databases can be organized under a hierarchical folder structure, the folders mapping to directories in the file system. Data collection module 1430 can include components for collecting data from multiple mobile devices wirelessly connected to system 1400 through access points or through other communication channels (e.g., cellular networks). Data distribution module 1440 can perform various functions for transmitting location data in association with access points of a wireless communications network to computing devices, including mobile devices 108 and 110. Location calculation module 1450 can include one or more components for performing multi-pass analysis on locations received from mobile devices 108.

Architecture 1400 can be included in any device capable of hosting a database application program. Architecture 1400 can be implemented in a parallel processing or peer-to-peer infrastructure or on a single device with one or more processors. Software can include multiple software components or can be a single body of code.

Exemplary Mobile Device Architecture

Figure 15:
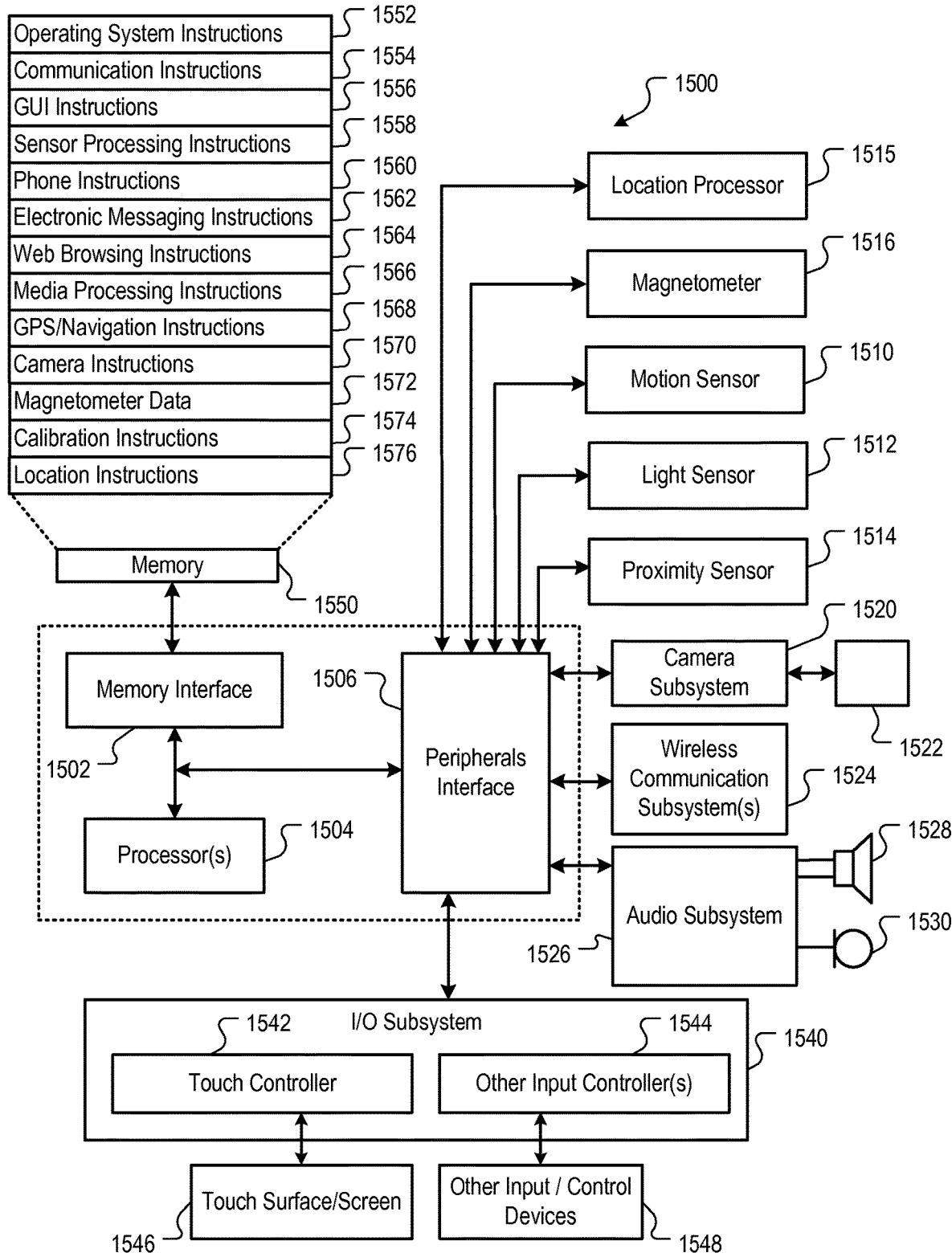
FIG. 15 is a block diagram of an exemplary architecture of a mobile device.

FIG. 15 is a block diagram of an exemplary architecture 1500 of a mobile device. The Mobile device can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

The mobile device can include a memory interface 1502, one or more data processors, image processors and/or central processing units 1504, and a peripherals interface 1506. The memory interface 1502, the one or more processors 1504 and/or the peripherals interface 1506 can be separate components or can be integrated in one or more integrated circuits. The various components in the mobile device 108 can be coupled to one or more communication buses or signal lines.

Sensors, devices, and subsystems can be coupled to peripherals interface 1506 to facilitate multiple functionalities. For example, motion sensor 1510, light sensor 1512, and proximity sensor 1514 can be coupled to peripherals interface 1506 to facilitate orientation, lighting, and proximity functions of the mobile device. Location processor 1515 (e.g., GPS receiver) can be connected to peripherals interface 1506 to provide geo-positioning. Electronic magnetometer 1516 (e.g., an integrated circuit chip) can also be connected to peripherals interface 1506 to provide data that can be used to determine the direction of magnetic North.

Camera subsystem 1520 and an optical sensor 1522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1524, which can include radio frequency receivers and transmitters and/or optical (e.g., infrared) receivers and transmitters. The specific design and implementation of the communication subsystem 1524 can depend on the communication network(s) over which the mobile device is intended to operate. For example, the mobile device may include communication subsystems 1524 designed to operate over a GSM network, a GPRS network, an EDGE network, a WiFi or WiMax network, and a Bluetooth network. In particular, the wireless communication subsystems 1524 may include hosting protocols such that the device may be configured as a base station for other wireless devices.

Audio subsystem 1526 can be coupled to a speaker 1528 and a microphone 1530 to facilitate voice-enabled functions, such as voice recognition, voice replication, digital recording, and telephony functions.

I/O subsystem 1540 can include a touch screen controller 1542 and/or other input controller(s) 1544. Touch-screen controller 1542 can be coupled to a touch screen 1546 or pad. Touch screen 1546 and touch screen controller 1542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1546.

Other input controller(s) 1544 can be coupled to other input/control devices 1548, such as one or more buttons, rocker switches, thumb-wheel, infrared port, USB port, and/or a pointer device such as a stylus. The one or more buttons (not shown) can include an up/down button for volume control of speaker 1528 and/or microphone 1530.

In one implementation, a pressing of the button for a first duration may disengage a lock of the touch screen 1546; and a pressing of the button for a second duration that is longer than the first duration may turn power to the mobile device on or off. The user may be able to customize a functionality of one or more of the buttons. The touch screen 1546 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a pin connector that is compatible with the iPod. Other input/output and control devices can also be used.

Memory interface 1502 can be coupled to memory 1550. Memory 1550 can include high-speed random access memory and/or non-volatile memory, such as one or more magnetic disk storage devices, one or more optical storage devices, and/or flash memory (e.g., NAND, NOR). Memory 1550 can store operating system 1552, such as Darwin, RTXC, LINUX, UNIX, OS X, WINDOWS, or an embedded operating system such as VxWorks. Operating system 1552 may include instructions for handling basic system services and for performing hardware dependent tasks. In some implementations, operating system 1552 can include a kernel (e.g., UNIX kernel).

Memory 1550 may also store communication instructions 1554 to facilitate communicating with one or more additional devices, one or more computers and/or one or more servers. Memory 1550 may include graphical user interface instructions 1556 to facilitate graphic user interface processing; sensor processing instructions 1558 to facilitate sensor-related processing and functions; phone instructions 1560 to facilitate phone-related processes and functions; electronic messaging instructions 1562 to facilitate electronic-messaging related processes and functions; web browsing instructions 1564 to facilitate web browsing-related processes and functions; media processing instructions 1566 to facilitate media processing-related processes and functions; GPS/Navigation instructions 1568 to facilitate GPS and navigation-related processes and instructions; camera instructions 1570 to facilitate camera-related processes and functions; magnetometer data 1572 and calibration instructions 1574 to facilitate magnetometer calibration. Memory 1550 can include location instructions 1576 that can be used to transmit a current location to an access point, and to determine an estimated current location based on location data associated with access points to which the mobile device is within a communication range. Memory 1550 can also store other software instructions (not shown), such as security instructions, web video instructions to facilitate web video-related processes and functions, and/or web shopping instructions to facilitate web shopping-related processes and functions. In some implementations, the media processing instructions 1566 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1550.

Each of the above identified instructions and applications can correspond to a set of instructions for performing one or more functions described above. These instructions need not be implemented as separate software programs, procedures, or modules. Memory 1550 can include additional instructions or fewer instructions. Furthermore, various functions of the mobile device can be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result.

A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, the location-aware devices are referred to as GPS-enabled. Location-aware mobile devices can also determine their location based on triangulation, trilateration or other technology. Cells are represented as substantially rectangular in shape in the figures. The actual shape of a cell can vary. Locations are described as "circles." The term "circle" used in this specification can include any geometric shape (e.g., an ellipsis, a square, a convex or concave polygon, or a free-style shape) that need not be perfectly circular but is closed or has an appearance of an enclosure. The radius of a geometric shape that is not perfectly circular can include an average distance between various points on the boundary of the geometric shape and a center of the geometric shape. WiFi and WiMax networks are used as examples. Other wireless technology (e.g., cellular network) can also be employed. Accordingly, other implementations are within the scope of the following claims.

What is claimed is:

1. A method comprising:
   receiving, by a navigation computer, a first set of harvest data and a second set of harvest data from one or more harvesting devices,
   wherein the first set of harvest data comprises an indication of access points of a wireless network observed by the one or more harvesting devices at one or more first harvesting locations, and an indication of the one or more harvesting locations, and
   wherein the second set of harvest data comprises an indication of access points of the wireless network observed by the one or more harvesting devices at one or more second harvesting locations, the second set of harvest data not including an indication of the one or more second harvesting locations, and
   generating, by the navigation computer, a first set of estimated locations of access points of a wireless network using the first set of harvest data;
   estimating, by the navigation computer, the one or more second harvesting locations based on the first set of estimated locations of the access points, wherein the one or more second harvesting locations are estimated using iterative multi-pass analysis on the first and the second sets of harvest data;
   generating, by the navigation computer, a second set of estimated locations of the access points using a combination of the first set of estimated locations of the access points, the estimated one or more second harvesting locations, and the second set of harvest data;
   receiving, by the navigation computer, a request from a requesting device for a data set for determining a location of the requesting device based on observations of one or more access points of the wireless network; and
   responsive to the request, sending, by the navigation computer, to the requesting device the data set including one or more estimated locations of the access points from the second set of estimated locations of the access points.

2. The method of claim 1, where the first and the second sets of harvest data are collected at harvest locations by the one or more harvesting devices, the one or more harvesting devices including one or more mobile devices having wireless transceivers capable of detecting presence of radio frequency (RF) signals transmitted by the access points.

3. The method of claim 2, where the first and the second sets of harvest data include unique identifiers for identifying the access points and received signal strength measurements for the RF signals transmitted by the access points.

4. The method of claim 3, where the first and the second sets of harvest data include timestamps identifying times when the first and the second sets of harvest data were collected by the one or more mobile devices.

5. The method of claim 1, where generating the first and the second sets of estimated locations of the access points includes applying a probability density function to the first and the second sets of harvest data, where the probability density function is associated with a cell of a geographic grid containing at least one of the access points.

6. The method of claim 1, where the first and the second sets of harvest data are filtered to identify moving access points.

7. The method of claim 1, where the first and the second sets of estimated locations of the access points are estimated using an iterative multi-pass analysis on the first and the second sets of harvest data.

8. A system comprising:
   one or more processors;
   memory storing instructions, which, when executed by the one or more processors, causes the one or more processors to perform operations comprising:
     receiving, by a navigation computer, a first set of harvest data and a second set of harvest data from one or more harvesting devices,
     wherein the first set of harvest data comprises an indication of access points of a wireless network observed by the one or more harvesting devices at one or more first harvesting locations, and an indication of the one or more harvesting locations, and
     wherein the second set of harvest data comprises an indication of access points of the wireless network observed by the one or more harvesting devices at one or more second harvesting locations, the second set of harvest data not including an indication of the one or more second harvesting locations, and
     generating, by the navigation computer, a first set of estimated locations of access points of a wireless network using the first set of harvest data;
     estimating, by the navigation computer, the one or more second harvesting locations based on the first set of estimated locations of the access points, wherein the one or more second harvesting locations are estimated using iterative multi-pass analysis on the first and the second sets of harvest data;
     generating, by the navigation computer, a second set of estimated locations of the access points using a combination of the first set of estimated locations of the access points, the estimated one or more second harvesting locations, and the second set of harvest data;
     receiving, by the navigation computer, a request from a requesting device for a dataset for determining a location of the requesting device based on observations of one or more access points of the wireless network; and
     responsive to the request, sending, by the navigation computer, to the requesting device the dataset including one or more estimated locations of the access points from the second set of estimated locations of the access points.

9. The system of claim 8, where the first and the second sets of harvest data are collected at harvest locations by the one or more harvesting devices, the one or more harvesting devices including one or more mobile devices having wireless transceivers capable of detecting presence of radio frequency (RF) signals transmitted by the access points.

10. The system of claim 9, where the first and the second sets of harvest data include unique identifiers for identifying the access points and received signal strength measurements for the RF signals transmitted by the access points.

11. The system of claim 10, where the first and the second sets of harvest data include timestamps identifying times when the sets of harvest data were collected by the one or more mobile devices.

12. The system of claim 8, where generating the first and the second sets of estimated locations of the access points includes applying a probability density function to the first and the second sets of harvest data, where the probability density function is associated with a cell of a geographic grid containing at least one of the access points.

13. The system of claim 8, where the first and the second sets of harvest data are filtered to identify moving access points.

14. The system of claim 8, where the first and the second sets of estimated locations of the access points are estimated using an iterative multi-pass analysis on the first and the second sets of harvest data.

15. A non-transitory, computer-readable storage medium having instructions stored thereon, which, when executed by one or more processors of a system, cause the one or more processors of the system to perform operations comprising:
   receiving, by a navigation computer, a first set of harvest data and a second set of harvest data from one or more harvesting devices,
      wherein the first set of harvest data comprises an indication of access points of a wireless network observed by the one or more harvesting devices at one or more first harvesting locations, and an indication of the one or more harvesting locations, and
      wherein the second set of harvest data comprises an indication of access points of the wireless network observed by the one or more harvesting devices at one or more second harvesting locations, the second set of harvest data not including an indication of the one or more second harvesting locations, and
   generating, by the navigation computer, a first set of estimated locations of access points of a wireless network using the first set of harvest data;
   estimating, by the navigation computer, the one or more second harvesting locations based on the first set of estimated locations of the access points, wherein the one or more second harvesting locations are estimated using iterative multi-pass analysis on the first and the second sets of harvest data;
   generating, by the navigation computer, a second set of estimated locations of the access points using a combination of the first set of estimated locations of the access points, the estimated one or more second harvesting locations, and the second set of harvest data;
   receiving, by the navigation computer, a request from a requesting device for a dataset for determining a location of the requesting device based on observations of one or more access points of the wireless network; and
   responsive to the request, sending, by the navigation computer, to the requesting device the dataset including one or more estimated locations of the access points from the second set of estimated locations of the access points.

16. The non-transitory, computer-readable storage medium of claim 15, where the first and the second sets of harvest data include unique identifiers for identifying the access points and received signal strength measurements for the RF signals transmitted by the access points.

17. The non-transitory, computer-readable storage medium of claim 16, where the first and the second sets of harvest data include timestamps identifying times when the sets of harvest data were collected by the one or more harvesting devices.

18. The non-transitory computer-readable storage medium of claim 15, where generating the first and the second sets of estimated locations of the access points includes applying a probability density function to the first and the second sets of harvest data, where the probability density function is associated with a cell of a geographic grid containing at least one of the access points.

19. The non-transitory, computer-readable storage medium of claim 15, where the first and the second sets of harvest data are filtered to identify moving access points.

20. The non-transitory, computer-readable storage medium of claim 15, where the access point locations are estimated using an iterative multi-pass analysis on the first and the second sets of harvest data.

21. The method of claim 1, wherein estimating the one or more second harvesting locations comprises performing the iterative multi-pass analysis until one or more stop conditions are satisfied, the one or more stop conditions comprising:
   a first condition in which a change in the second set of estimated locations of the access points in successive iterations of the iterative multi-pass analysis is less than a threshold value.

22. The method of claim 21, where the one or more stop conditions comprise:
   a second condition in which a number of estimated access points of the wireless network in successive iterations of the iterative multi-pass analysis does not change.

23. The system of claim 8, wherein estimating the one or more second harvesting locations comprises performing the iterative multi-pass analysis until one or more stop conditions are satisfied, the one or more stop conditions comprising:
   a first condition in which a change in the second set of estimated locations of the access points in successive iterations of the iterative multi-pass analysis is less than a threshold value.

24. The system of claim 23, wherein the one or more stop conditions comprise:
   a second condition in which a number of estimated access points of the wireless network in successive iterations of the iterative multi-pass analysis does not change.

25. The non-transitory, computer-readable storage medium of claim 15, wherein estimating the one or more second harvesting locations comprises performing the iterative multi-pass analysis until one or more stop conditions are satisfied, the one or more stop conditions comprising:
   a first condition in which a change in the second set of estimated locations of the access points in successive iterations of the iterative multi-pass analysis is less than a threshold value.

26. The non-transitory, computer-readable storage medium of claim 25, wherein the one or more stop conditions comprise:
   a second condition in which a number of estimated access points of the wireless network in successive iterations of the iterative multi-pass analysis does not change.

* * * * *